(12) United States Patent
Kwon et al.

(10) Patent No.: US 8,971,399 B2
(45) Date of Patent: Mar. 3, 2015

(54) APPARATUS FOR AND METHOD OF TRANSMITTING HIGH EFFICIENCY VARIABLE POWER

(75) Inventors: Sang Wook Kwon, Seongnam-si (KR); Jin Sung Choi, Seoul (KR); Ki Young Kim, Yongin-si (KR); Nam Yun Kim, Seoul (KR); Dong Zo Kim, Yongin-si (KR); Yun Kwon Park, Dongducheon-si (KR); Eun Seok Park, Yongin-si (KR); Young Ho Ryu, Yongin-si (KR); Chang Wook Yoon, Seoul (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 13/482,027

(22) Filed: May 29, 2012

(65) Prior Publication Data

US 2012/0300875 A1 Nov. 29, 2012

(30) Foreign Application Priority Data

May 27, 2011 (KR) ........................ 10-2011-0050410

(51) Int. Cl.
*H03K 7/08* (2006.01)
*H04L 25/03* (2006.01)
(52) U.S. Cl.
CPC ................................. *H04L 25/0384* (2013.01)
USPC ........... 375/238; 375/295; 375/316; 375/297; 375/219; 375/300; 375/302

(58) Field of Classification Search
USPC ......... 375/238, 295, 316, 319, 297, 219, 300, 375/302
See application file for complete search history.

(56) References Cited

U.S. PATENT DOCUMENTS

| 5,345,231 | A  | * | 9/1994  | Koo et al. ................ 340/870.31 |
| 7,872,794 | B1 | * | 1/2011  | Minelly et al. ........... 359/341.31 |
| 2005/0131494 | A1 | * | 6/2005  | Park et al. ....................... 607/60 |
| 2007/0149162 | A1 | * | 6/2007  | Greene et al. .............. 455/343.1 |
| 2007/0259629 | A1 | * | 11/2007 | Lee et al. .................... 455/127.1 |
| 2009/0157145 | A1 | * | 6/2009  | Cauller .......................... 607/60 |

(Continued)

FOREIGN PATENT DOCUMENTS

| JP | 10-14124 A    | 1/1998 |
| JP | 2006-254412 A | 9/2006 |

(Continued)

*Primary Examiner* — Kenneth Lam
(74) *Attorney, Agent, or Firm* — NSIP Law

(57) ABSTRACT

An apparatus for transmitting a high efficiency variable power includes a pulse generating unit configured to generate a pulse signal comprising a pulse having a duration corresponding to an amount of power transmitted; a pulse stream generating unit configured to convert the pulse signal to a pulse stream having pulse shape corresponding to the duration of the pulse and data to be transmitted; and a high frequency modulating unit configured to output a variable power by modulating a high frequency signal having a constant amplitude on a time axis by repeatedly outputting and not outputting the high frequency signal based on the pulse stream.

10 Claims, 20 Drawing Sheets

(56) References Cited

U.S. PATENT DOCUMENTS

| | | | |
|---|---|---|---|
| 2011/0148221 A1* | 6/2011 | Trotter et al. | 307/104 |
| 2012/0149303 A1* | 6/2012 | Moes et al. | 455/41.1 |
| 2012/0235507 A1* | 9/2012 | Choi et al. | 307/104 |
| 2012/0235636 A1* | 9/2012 | Partovi | 320/108 |
| 2012/0300872 A1* | 11/2012 | Kim et al. | 375/295 |
| 2012/0330384 A1* | 12/2012 | Perryman et al. | 607/72 |
| 2013/0076156 A1* | 3/2013 | Anttila et al. | 307/104 |

FOREIGN PATENT DOCUMENTS

| | | |
|---|---|---|
| JP | 2006-303912 A | 11/2006 |
| KR | 10-2004-0110184 A | 12/2004 |
| KR | 10-2008-0055498 A | 6/2008 |
| KR | 10-0873428 B1 | 12/2008 |

\* cited by examiner

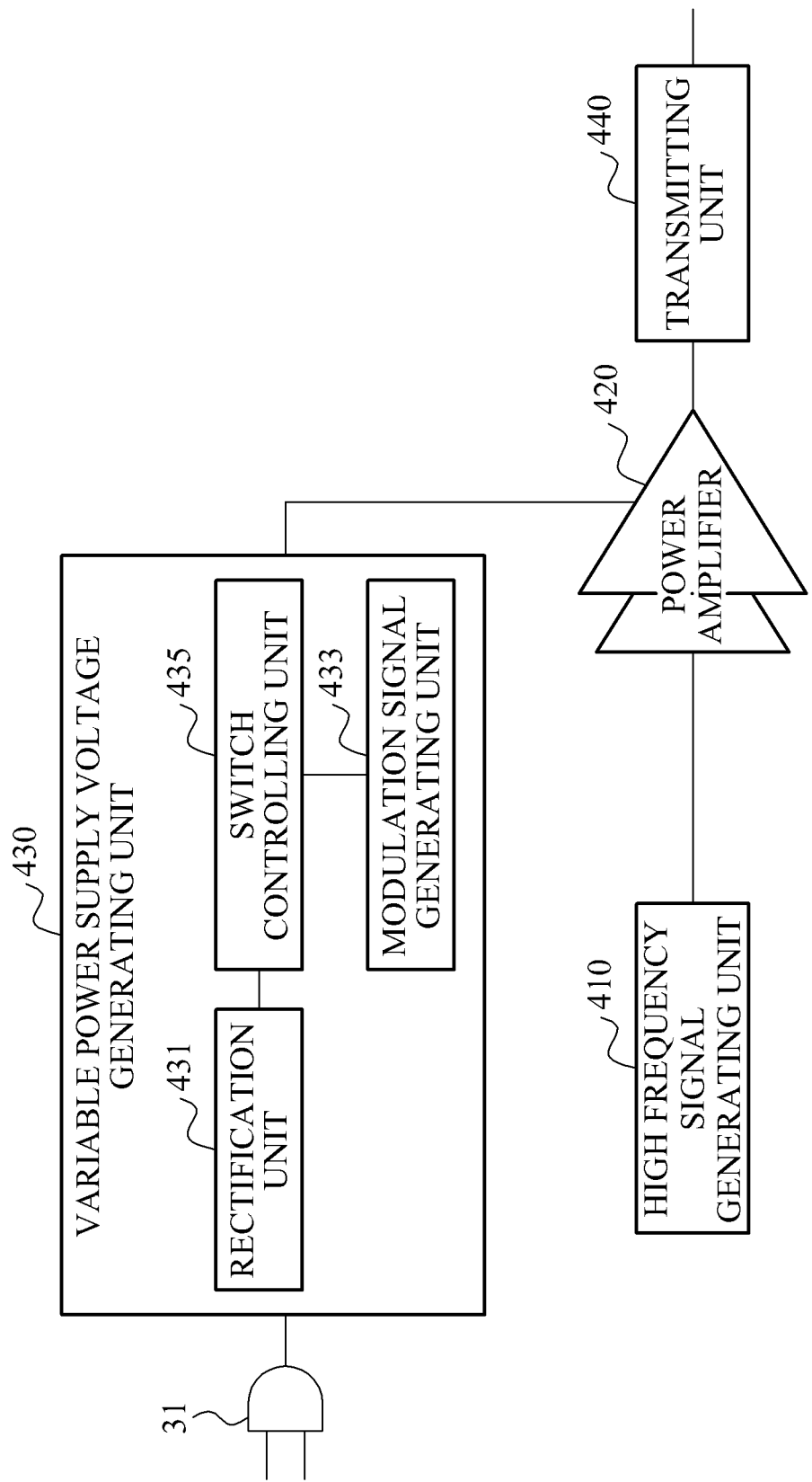

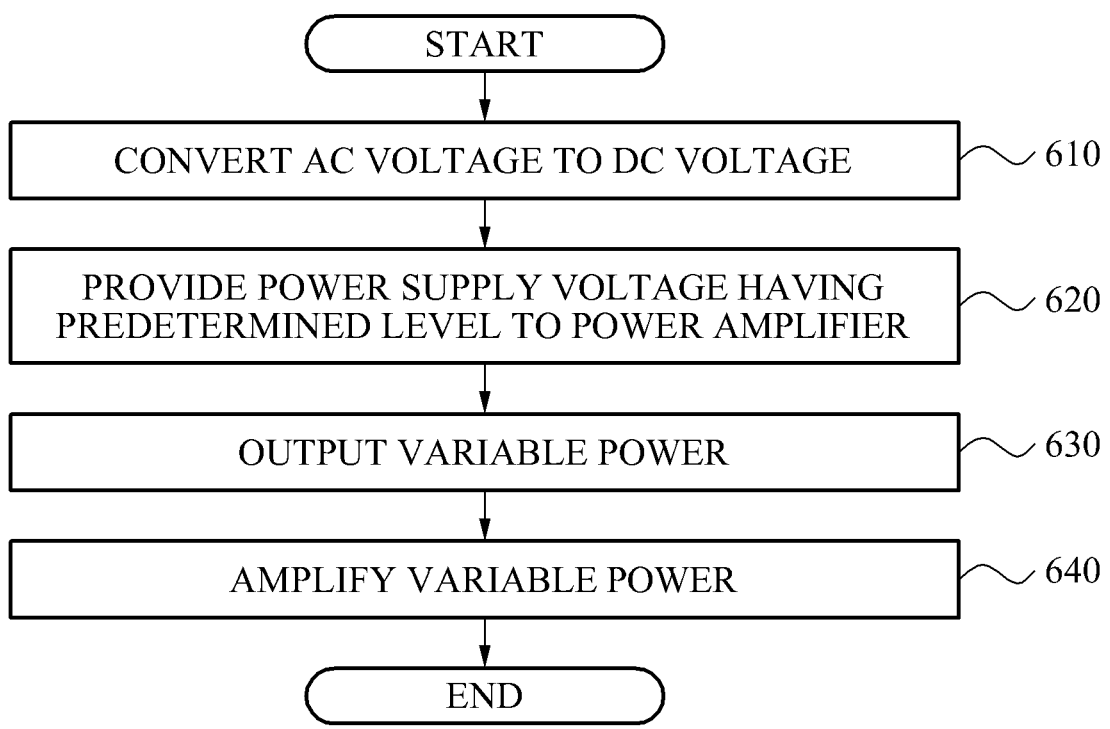

FIG. 10

| DURATION | DATA | PULSE SHAPE |
|---|---|---|
| 1D | 00 | 1 0 0 0 0 |
|  | 01 | 0 1 0 0 0 |
|  | 10 | 0 0 1 0 0 |
|  | 11 | 0 0 0 1 0 |
| 2D | 00 | 1 1 0 0 0 |
|  | 01 | 0 1 1 0 0 |
|  | 10 | 0 0 1 1 0 |
|  | 11 | 1 0 0 1 0 |
| 3D | 00 | 1 1 1 0 0 |
|  | 01 | 0 1 1 1 0 |
|  | 10 | 1 0 1 1 0 |
|  | 11 | 1 1 0 1 0 |
| 4D | 00 | 1 1 1 0 1 |
|  | 01 | 0 1 1 1 1 |
|  | 10 | 1 0 1 1 1 |
|  | 11 | 1 1 0 1 1 |

APPARATUS FOR AND METHOD OF TRANSMITTING HIGH EFFICIENCY VARIABLE POWER

CROSS-REFERENCE TO RELATED APPLICATIONS

This application claims the benefit under 35 USC 119(a) of Korean Patent Application No. 10-2011-0050410 filed on May 27, 2011, in the Korean Intellectual Property Office, the entire disclosure of which is incorporated herein by reference for all purposes.

BACKGROUND

1. Field

The following description relates to an apparatus for and a method of wirelessly transmitting data together with a variable power.

2. Description of Related Art

Research on wireless power transmission is underway to overcome problems, such as the inconvenience of a wired power supply, or a limit to an existing battery capacity, resulting from a rapid increase in mobile devices requiring electric power, electric vehicles, mobile electronic devices, and the like. An example of wireless power transmission technology may use resonance characteristics of radio-frequency (RF) elements.

An example of a wireless power transmission system using resonance characteristics includes a source that supplies power and a target that receives power. The source includes a power amplifier that amplifies a source power to a power level requested by the target. When the power level requested by the target changes, the power amplifier needs to amplify the source power to a power level corresponding to the changed power level.

SUMMARY

In one general aspect, an apparatus for transmitting a high efficiency variable power includes a pulse generating unit configured to generate a pulse signal including a pulse having a duration corresponding to an amount of power to be transmitted; a pulse stream generating unit configured to convert the pulse signal to a pulse stream having a pulse shape corresponding to the duration of the pulse and data to be transmitted; and a high frequency modulating unit configured to output a variable power by modulating a high frequency signal having a constant amplitude on a time axis by repeatedly outputting and not outputting the high frequency signal based on the pulse stream.

The pulse stream generating unit may be further configured to search for a pulse shape corresponding to the duration of the pulse and the data to be transmitted in a table in which pulse shapes are mapped to durations and data; and convert the pulse signal to the pulse stream using a pulse shape found in the search.

The pulse stream generating unit may be further configured to insert a training sequence indicating a beginning of the pulse stream at the beginning of the pulse stream generated from the pulse signal.

The pulse signal may have a predetermined period; and the duration of the pulse may be less than the predetermined period.

The amount of power to be transmitted may be an amount of power requested by a target device to which power is to be transmitted by the apparatus.

In another general aspect, an apparatus for receiving a high efficiency variable power includes a pulse stream detecting unit configured to extract a pulse stream from a received signal; and a data converting unit configured to segment the pulse stream into segments each having a predetermined period; and output data corresponding to pulse shapes of the segments of the segmented pulse stream.

The pulse stream detecting unit may be further configured to detect a beginning of the pulse stream by extracting a training sequence indicating the beginning of the pulse stream from the received signal.

A total duration of pulses in each of the segments of the segmented pulse stream may be less than the predetermined period.

The data converting unit may be further configured to identify the data corresponding to the pulse shapes of the segments of the segmented pulse stream by searching a table in which pulse shapes are mapped to data.

The apparatus may further include a rectification unit configured to rectify the received signal to generate a direct current (DC) voltage; a DC-to-DC (DC/DC) converter configured to adjust a level of the generated DC voltage to a predetermined level, and output the adjusted DC voltage; and a charging unit configured to use the adjusted DC voltage output from the DC/DC converter to charge a battery or provide an operating voltage; wherein an amount of power provided to the charging unit may be determined by an average duration of pulses of the received signal.

In another general aspect, a method of receiving a high efficiency variable power includes generating a pulse signal including a pulse having a duration corresponding to an amount of power to be transmitted; converting the pulse signal to a pulse stream having a pulse corresponding to the duration of the pulse and data to be transmitted; and outputting a variable power by modulating a high frequency signal having a constant amplitude on a time axis by repeatedly outputting and not outputting the high frequency signal based on the pulse stream.

The converting may include searching for a pulse shape corresponding to the duration of the pulse and the data to be transmitted in a table in which pulse shapes are mapped to durations and data; and converting the pulse signal to the pulse stream using a pulse shape found in the search.

The converting may include inserting a training sequence indicating a beginning of the pulse stream at the beginning of the pulse stream generated from the pulse signal.

The pulse signal may have a predetermined period; and the duration of the pulse may be less than the predetermined period.

The amount of power to be transmitted may be an amount of power requested by a target device to which power is to be transmitted.

In another general aspect, a method of receiving a high efficiency variable power includes extracting a pulse stream from a received signal; segmenting the pulse stream into segments each having a predetermined period; and outputting data corresponding to pulse shapes of the segments of the segmented pulse stream.

The extracting may include detecting a beginning of the pulse stream by extracting a training sequence indicating the beginning of the pulse stream from the received signal.

A total duration of pulses in each of the segments of the segmented pulse stream may be less than the predetermined period.

The outputting may include identifying data corresponding to the pulse shapes of the segments of the segmented pulse stream by searching a table in which pulse shapes are mapped to data.

The method may further include generating a direct current (DC) voltage by rectifying the received signal; adjusting a level of the generated DC voltage to a predetermined level to produce an adjusted DC voltage; and using the adjusted DC voltage in a charging unit to charge a battery or provide an operating voltage; wherein an amount of power provided to the charging unit may determined by an average duration of pulses of the received signal.

Other features and aspects will be apparent from the following detailed description, the drawings, and the claims.

BRIEF DESCRIPTION OF THE DRAWINGS

FIG. 4 is a block diagram illustrating another example of an apparatus for transmitting a high efficiency variable power.

FIG. 6 is a flowchart illustrating an example of a method of transmitting a high efficiency variable power.

FIG. 10 is a diagram illustrating an example of a table used to identify a pulse shape corresponding to a duration of a pulse signal and data to be transmitted in an apparatus for transmitting a high efficiency variable power.

DETAILED DESCRIPTION

Figure 1:
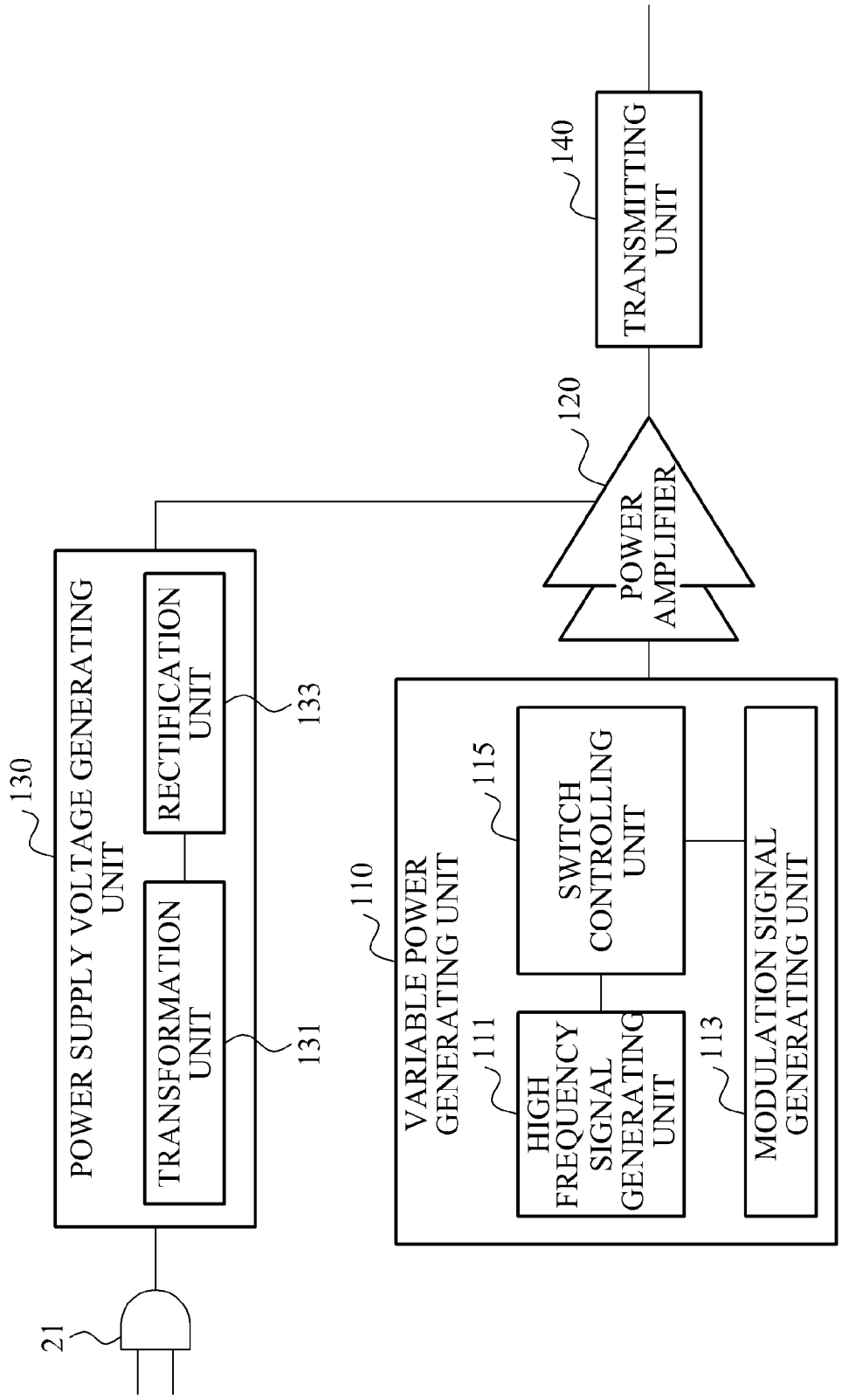
FIG. 1 is a block diagram illustrating an example of an apparatus for transmitting a high efficiency variable power.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of processing steps and/or operations described herein are merely examples, and are not limited to the examples forth herein, but may be changed as will be apparent to one of ordinary skill the art, with the exception of processing steps and/or operations necessarily occurring in a certain order. Also, description of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

In a wireless power transmission system, a power supplying unit to provide a power to a power amplifier is generally configured using a Switching-Mode Power Supply (SMPS). The SMPS may convert an alternating current (AC) voltage of approximately 100 volts (V) or 200 V to a predetermined direct current (DC) voltage, and may provide the predetermined DC voltage as a power used to operate the power amplifier to ensure a stable operation of the power amplifier.

The SMPS may be configured using a DC converter and a DC-to-DC (DC/DC converter), which may cause a size of the SMPS to be greater than sizes of other elements of a transmitter that transmits a wireless power.

The wireless power transmission system may need to transmit a power that varies depending on a state of a receiver and an external environment of the receiver. However, when a power input to the power amplifier is decreased to change a power output from a transmitter, a transmission efficiency may be sharply reduced.

In order to transmit a variable power without reducing the transmission efficiency, a method of changing a voltage output from the SMPS and supplying the changed output voltage to the power amplifier as a variable power supply voltage for the power amplifier may be considered. However, it may be difficult to design a power amplifier to have a maximum efficiency when operating on a variable power supply voltage. Also, a configuration of an SMPS circuit designed to output a fixed voltage may already be quite complex, and a size of such an SMPS circuit may already be quite large. Accordingly, when a new function of outputting a variable voltage is added, the configuration of the SMPS circuit may become more complex, the size of the SMPS circuit may become even larger, and the efficiency of the SMPS circuit may be reduced.

Described below are examples of a method of generating a variable power with a power amplifier while a power supply voltage of the power amplifier and an input voltage of the power amplifier are maintained at fixed values. Hereinafter, a source device refers to a device including a transmitter to transmit a wireless power, and a target device refers to a device including a receiver to receive a wireless power.

FIG. 1 is a block diagram illustrating an example of an apparatus for transmitting a high efficiency variable power. Referring to FIG. 1, the high efficiency variable power transmitting apparatus includes a variable power generating unit 110, a power amplifier 120, a power supply voltage generating unit 130, and a transmitting unit 140.

The variable power generating unit 110 modulates a high frequency signal having a constant amplitude on a time axis. In particular, the variable power generating unit 110 generates a variable power by modulating a high frequency signal generated by a high frequency generating unit 111 by repeatedly outputting and not outputting the high frequency signal. The variable power generating unit 110 generates the variable power by modulating the high frequency signal based on a low frequency modulation signal that determines durations during which the high frequency signal is output and not output.

The variable power generating unit 110 includes the high frequency generating unit 111, a modulation signal generating unit 113, and a switch controlling unit 115.

The high frequency signal generating unit 111 generates a high frequency signal having a constant amplitude, and outputs the high frequency signal having the constant amplitude to the power amplifier 120 via the switch controlling unit 114.

The modulation signal generating unit 113 generates a low frequency modulation signal having a duty cycle corresponding to an amount of power requested by a target device (not shown). The modulation signal generating unit 113 generates the low frequency modulation signal by determining a duration within one period during which the high frequency signal is to be continuously output, and a duration within one period during which the high frequency signal is to be continuously not output. That is, the modulation signal generating unit 113 generates the low frequency modulation signal by determining a duty cycle corresponding to the amount of power requested by the target device within one period.

As an example, when a maximum power is requested by the target device, the modulation signal generating unit 113 generates the low frequency modulation signal to be continuously in a HIGH state during one period, that is, it determines a duty cycle of the low frequency modulation signal to be 100 percent (%). This causes the high frequency signal to be continuously input to the power amplifier 120 during the one period. Accordingly, the output power of the power amplifier 120 will be a maximum output power, i.e., an output power of 100%, during the one period.

As another example, when a minimum power is requested by the target device, the modulation signal generating unit 113 generates the low frequency modulation signal to be continuously in a LOW state during one period, that is, it determines a duty cycle of the low frequency modulation signal to be 0%. This causes the high frequency signal to be continuously not input to the power amplifier 120 during the one period. Accordingly, the power output from the power amplifier 120 will be a minimum output power, i.e., an output power of 0%, during the one period.

The modulation signal generating unit 113 may generate the low frequency modulation signal by performing delta-sigma modulation so that the low frequency modulation signal has a pulse width corresponding to the amount of power requested by the target device. That is, the modulation signal generating unit 113 may generate the low frequency modulation signal by determining durations during which the high frequency signal is to be continuously output and not output by performing the delta-sigma modulation. As an example, the low frequency modulation signal may be HIGH when the high frequency signal is to be continuously output, and may be LOW when the high frequency signal is to be continuously not output.

The switch controlling unit 115 controls a switch (not shown) to turn ON and OFF according to the duty cycle of the low frequency modulation signal so that the high frequency signal generated by the high frequency signal generating unit 111 is modulated by the low frequency modulation signal generated by the modulation signal generating unit 113. For example, switch controlling unit 115 may control the switch to turn ON when the low frequency modulation signal is HIGH, and may control the switch to turn OFF when the low frequency modulation signal is LOW.

The high frequency signal has a constant amplitude, and is continuously input to the power amplifier 120 during ON states of the switch determined by the duty cycle of the low frequency modulation signal, and is continuously not input to the power amplifier 120 during OFF states of the switch determined by the duty cycle of the low frequency modulation signal. Thus, an input power of the power amplifier 120 varies between a maximum input power during the ON states of the switch, and a minimum input power during the OFF states of the switch, resulting in an average input power that depends on the duty cycle of the low frequency modulation signal, i.e., an input power that varies as the duty cycle of the low frequency modulation signal varies. Accordingly, the variable power generating unit 110 generates a variable power that depends on the duty cycle of the low frequency modulation signal, and the power amplifier 120 amplifies this variable power to produce a variable output power that depends on the duty cycle of the low frequency modulation signal.

The power amplifier 120 amplifies the variable power generated by the variable power generating unit 110 to the amount of power requested by the target device based on a power supply voltage having a predetermined level. Since the power supply voltage of the power amplifier 120 has a predetermined level, the power amplifier 120 is able to amplify the variable power input generated by the variable power generating unit 110 with a high efficiency.

The power supply voltage generating unit 130 converts an AC voltage received from a power source 21 to a DC voltage, generates a power supply voltage having a predetermined level based on the DC voltage, and provides the power supply voltage having the predetermined level to the power amplifier 120.

The power supply voltage generating unit 130 may be implemented using a conventional SMPS, or may be implemented using a simple configuration of a transformation unit 131 and a rectification unit 133 as shown in FIG. 1 instead of using the more complex SMPS.

The transformation unit 131 steps down an AC voltage received from the power supply 21, for example, an AC voltage of approximately 200 V, to a relatively low AC voltage corresponding to an operating voltage of a source device (not shown) and supplies the relatively low AC voltage to the rectification unit 133. The transformation unit 131 may be a 1:N transformer.

The rectification unit 133 generates a DC voltage having a predetermined level by rectifying the stepped down AC voltage. The DC voltage having the predetermined level generated by the rectification unit 133 is provided to the power amplifier 120 as a power supply voltage of the power amplifier 120, thereby providing the power amplifier 120 with a stable power supply voltage.

Alternatively, the power supply voltage generating unit 130 may include only the rectification unit 133. The rectification unit 133 may generate a DC voltage having a predetermined level by rectifying an AC voltage received from the power source 21.

The transmitting unit 140 transmits, to the target device, a variable power that has been amplified by the power amplifier 140 to the amount of power requested by the target device via a transmitting coil or an antenna (not shown).

Figure 2:
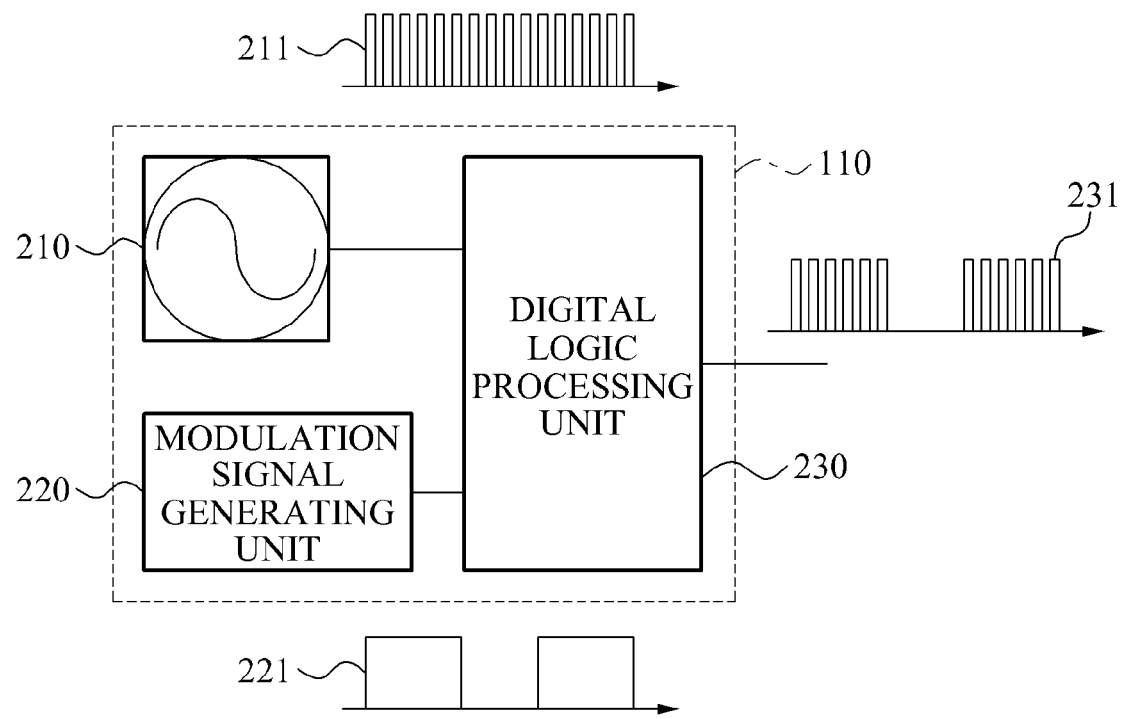
FIG. 2 is a block diagram illustrating an example of a variable power generating unit.

FIG. 2 is a block diagram illustrating an example of the variable power generating unit 110 of FIG. 1. Referring to FIG. 2, the variable power generating unit 110 includes a high frequency signal generating unit 210, a modulation signal generating unit 220, and a digital logic processing unit 230.

The high frequency signal generating unit 210 generates a high frequency signal 211 having a constant amplitude.

The modulation signal generating unit 220 generates a low frequency modulation signal 221 having a duty cycle corresponding to an amount of power requested by a target device.

The modulation signal generating unit 220 may generate the low frequency modulation signal 221 by performing delta-sigma modulation so that the low frequency modulation signal 221 has a pulse width corresponding to the amount of power requested by the target device. Alternatively, the modulation signal generating unit 220 may generate the low frequency modulation signal 221 using any of various other methods of modulating a pulse width on a time axis that are known to one of ordinary skill in the art.

The digital logic processing unit 230 performs a logical operation so that the high frequency signal 211 generated by the high frequency signal generating unit 210 is modulated on a time axis by the low frequency modulation signal 221 generated by the modulation signal generating unit 220. The digital logic processing unit 230 performs the logical operation so that the high frequency signal 211 is output only when the low frequency modulation signal 221 is HIGH, thereby outputting a variable power 231. For example, the digital logic processing unit 230 may be configured as an AND gate. However, the digital logic processing unit 230 may be configured as a more complex logical circuit that performs the same function as an AND gate.

Figure 3:
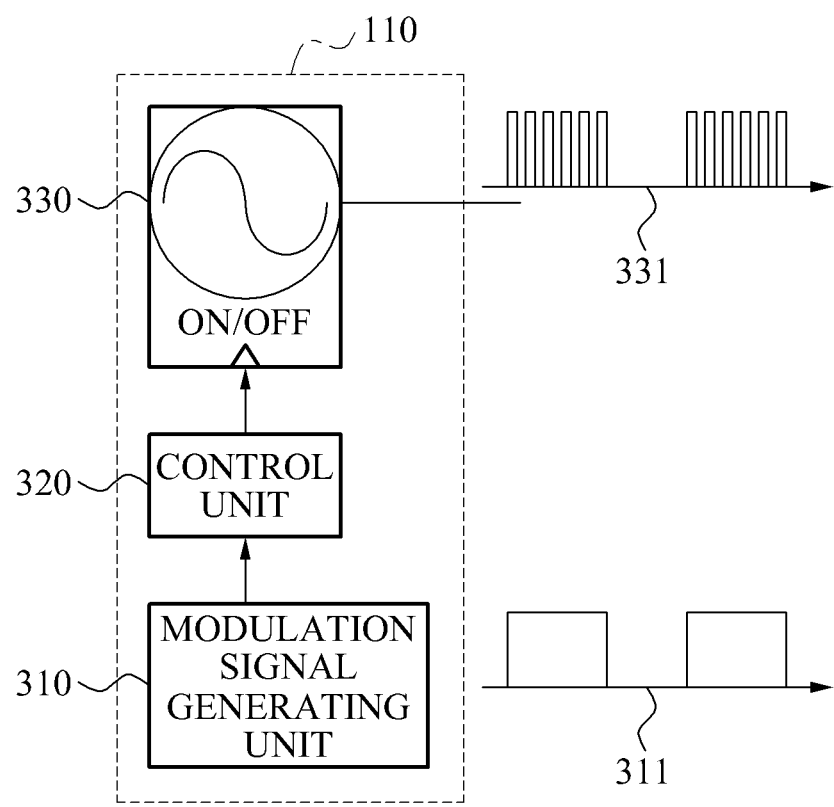
FIG. 3 is a block diagram illustrating another example of a variable power generating unit.

FIG. 3 is a block diagram illustrating another example of the variable power generating unit 110 of FIG. 1. Referring to FIG. 3, the variable power generating unit 110 includes a modulation signal generating unit 310, a control unit 320, and a high frequency signal generating unit 330.

The modulation signal generating unit 310 generates a low frequency modulation signal 311 having a duty cycle corresponding to an amount of power requested by a target device.

The modulation signal generating unit 310 may generate the low frequency modulation signal 311 by performing delta-sigma modulation so that the low frequency modulation signal 311 has a pulse width corresponding to the amount of power requested by the target device.

The control unit 320 controls an operation of the high frequency signal generating unit 330 based on the low frequency modulation signal 311 generated by the modulation signal generating unit 310. The control unit 320 turns the high frequency signal generating unit 330 ON and OFF to modulate a high frequency signal having a constant amplitude generated by the high frequency signal generating unit 330 on a time axis based on the low frequency modulation signal 311. For example, the control unit 320 turns the high frequency generating unit 330 ON when the low frequency modulation signal 311 is HIGH, and turns the high frequency signal generating unit 330 OFF when the low frequency modulation signal 311 is LOW. This causes the high frequency signal generating unit 330 to output the high frequency signal when the low frequency modulation signal 311 is HIGH, and to not output the high frequency signal when the low frequency modulation signal 311 is low, causing the high frequency signal generating unit 330 to output a variable power 331 having a constant amplitude based on the low frequency modulation signal 311.

FIG. 4 is a block diagram illustrating another example of an apparatus for transmitting a high efficiency variable power. Referring to FIG. 4, the high efficiency variable power transmitting apparatus includes a high frequency signal generating unit 410, a power amplifier 420, a variable power supply voltage generating unit 430, and a transmitting unit 440.

The high frequency signal generating unit 410 generates a high frequency signal having a constant amplitude.

The power amplifier 420 amplifies a power of the high frequency signal generated by the high frequency signal generating unit 410 to an amount of power requested by a target device (not shown) using a variable power supply voltage generated by the variable power supply voltage generating unit 430. The power amplifier 420 is able to amplify the constant power of the high frequency signal with a high efficiency because the high frequency signal has a constant amplitude.

The variable power supply voltage generating unit 430 converts an AC voltage received from a power source 31 to a DC voltage, modulates the DC voltage on a time axis by repeatedly outputting and not outputting the DC voltage based on a low frequency modulation signal, thereby generating a variable power supply voltage, and provides the variable power supply voltage to the power amplifier 420.

The variable power supplying unit 430 includes a rectification unit 431, a modulation signal generating unit 433, and a switch controlling unit 435.

The rectification unit 431 generates a DC voltage by rectifying an AC voltage received from the power source 31.

The modulation signal generating unit 433 generates a low frequency modulation signal having a duty cycle corresponding to the amount of power requested by the target device. The modulation signal generating unit 433 generates the low frequency modulation signal by determining a duration within one period during which the DC voltage generated by the rectification unit 431 is to be continuously output, and a duration within the one period during which the DC voltage generated by the rectification unit 431 is to be continuously not output. That is, the modulation signal generating unit 433 generates the low frequency modulation signal by determining a duty cycle corresponding to the amount of power requested by the target device within the one period.

As an example, when a maximum power is requested by the target device, the modulation signal generating unit 433 generates the low frequency modulation signal to be continuously in a HIGH state during one period, that is, it determines a duty cycle of the low frequency modulation signal to be 100%. This causes the DC voltage generated by the rectification unit 431 to be continuously input to the power amplifier 420 during the one period. Accordingly, the output power of the power amplifier 420 will be a maximum output power, i.e., an output power of 100%, during the one period.

As another example, when a minimum power is requested by the target device, the modulation signal generating unit 433 generates the low frequency modulation signal to be continuously in a LOW state during one period, that is, it determines a duty cycle of the low frequency modulation signal to be 0%. This causes the DC voltage to be continuously not input to the power amplifier 420 during the one period. Accordingly, the output power of the power amplifier 420 will be a minimum output power, i.e., an output power of 0%, during the one period.

The modulation signal generating unit 433 may generate the low frequency modulation signal by performing delta-sigma modulation so that the low frequency modulation signal has a pulse width corresponding to the amount of power requested by the target device.

The switch controlling unit 435 controls a switch (not shown) to turn ON and OFF based on the duty cycle of the low frequency modulation signal so that the DC voltage generated by the rectification unit 431 is modulated by the low frequency modulation signal generated by the modulation signal generating unit 433. For example, the switch controlling unit 435 may control the switch to turn ON when the low frequency modulation signal is HIGH, and may control the switch to turn OFF when the low frequency modulation signal is LOW.

The variable power supplying unit 430 may further include a transformation unit (not shown, but similar to the transformation unit 131 in FIG. 1), which may step down an AC voltage received from the power source 31, for example, an AC voltage of approximately 200 V, to relatively low AC voltage corresponding to an operating voltage of a source device (not shown), and supply the relatively low AC voltage to the rectification unit 431. The transformation unit may be a 1:N transformer.

The transmitting unit 440 transmits, to the target device, a variable power that has been amplified by the power amplifier 420 to the amount of power requested by the target device via a transmitting coil or an antenna.

Figure 5A:
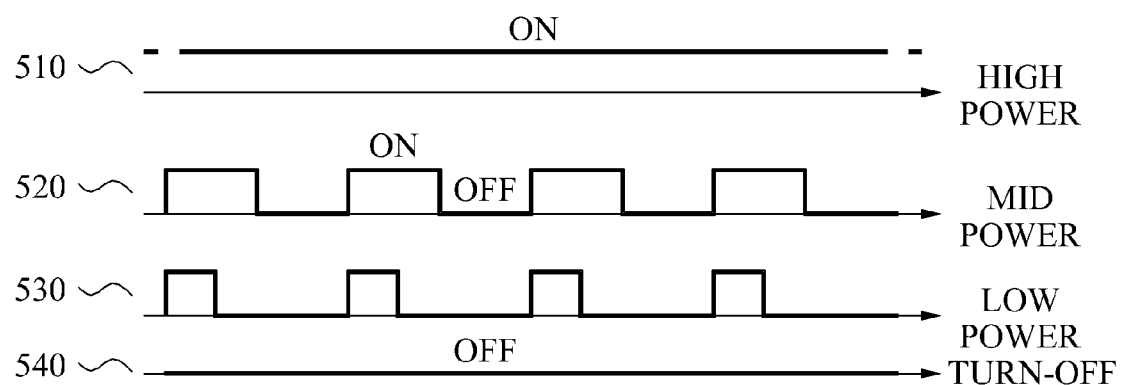
FIG. 5A is a diagram illustrating examples of low frequency modulation signals having duty cycles corresponding to amounts of power requested by a target device that are generated in an apparatus for transmitting a high efficiency variable power.
Figure 5B:
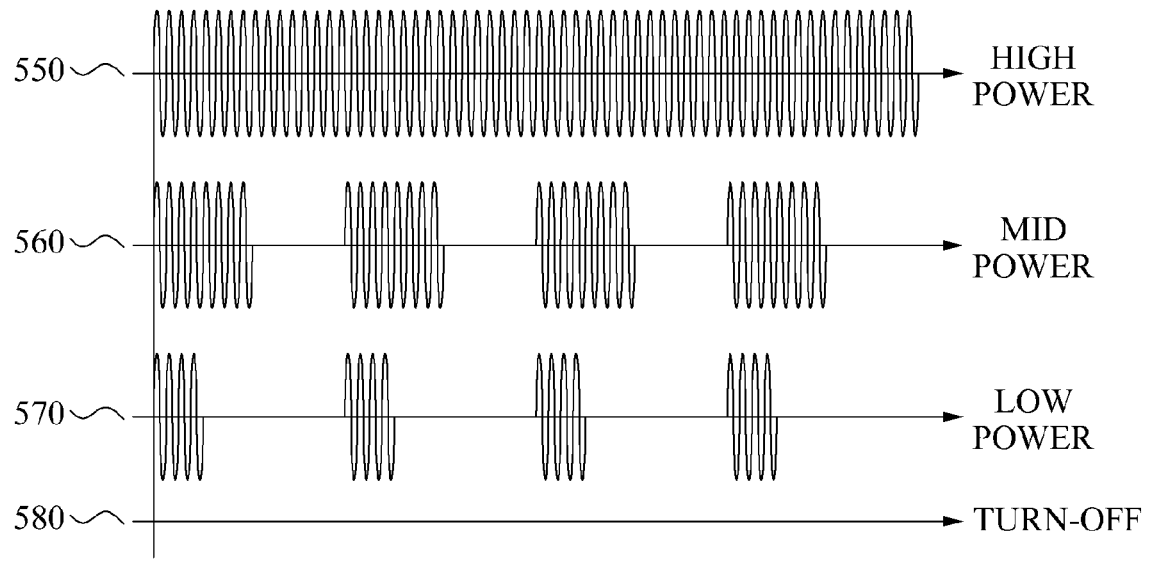
FIG. 5B is a diagram illustrating examples of variable output powers corresponding to the modulation signals of FIG. 5A that are output from a power amplifier of the apparatus for transmitting a high efficiency variable power.

FIG. 5A is a diagram illustrating examples of low frequency modulation signals having duty cycles corresponding to amounts of power requested by a target device that are generated in an apparatus for transmitting a high efficiency variable power, and FIG. 5B is a diagram illustrating examples of variable output powers corresponding to the modulation signals of FIG. 5A that are output from a power amplifier of the apparatus for transmitting a high efficiency variable power.

Referring to FIG. 5A, in a case 510 in which a high amount of power is requested by the target device, the low frequency modulation signal stays at a HIGH or ON level, and thus has a duty cycle of 100%. In a case 520 in which a medium amount of power is requested by the target device, or in a case 530 in which a low amount of power is requested by the target device, the low frequency modulation signal has a duty cycle that corresponds to the amount of power requested, and decreases as the amount of power requested decreases, so that a duration of time periods in which the low frequency modulation signal is at the HIGH or ON level decreases as an amount of power requested by the target device decreases. In a case 540 in which an amount of power requested by the target device is 0, that is, a case in which the target device is turned OFF, the low frequency modulation signal stays at a LOW or OFF level, and thus has a duty cycle of 0%, because a wireless power does not need to be transmitted.

Referring to FIG. 5, in a case 550 in which a high amount of power is requested by the target device, the power amplifier outputs an amplified high frequency signal having a constant amplitude continuously because the low frequency modulation signal stays at the HIGH or ON level. Accordingly, an output power of the power amplifier is a maximum output power. In a case 560 in which a medium amount of power is requested by the target device, or a case 570 in which a low amount of power is requested by the target device, the power amplifier outputs the amplified high frequency signal having a constant amplitude during the time periods in which the low frequency modulation signal is at the HIGH or ON level, such that an output power of the power amplifier corresponds to the amount of power requested by the target device, and decreases as the duration of the time periods in which the low frequency modulation signal is at the HIGH or ON level decreases. In a case 580 in which an amount of power requested by the target device is 0, that is, a case in which the target device is turned OFF, the power amplifier does not output the amplified high frequency signal having a constant amplitude because the low frequency modulation signal stays at the LOW or OFF level, and therefore the power amplifier does not need to output a power because a wireless power does not need to be transmitted. Thus, as can be seen from FIGS. 5A and 5B, the power amplifier outputs a variable output power based on the duty cycle of the low frequency modulation signal.

FIG. 6 is a flowchart illustrating an example of a method of transmitting a high efficiency variable power. The descriptions of FIGS. 1-3 are also applicable to FIG. 6, but will not be repeated here for conciseness. In 610, an apparatus for transmitting a high efficiency variable power converts an AC voltage received from a power source to a DC voltage. The high efficiency variable power transmitting apparatus may convert the AC voltage to the DC voltage using a rectification unit. Alternatively, the high efficiency variable power transmitting apparatus may convert the AC voltage to the DC voltage using an AC-to-DC (AC/DC) converter.

In 620, the high efficiency variable power transmitting apparatus generates a power supply voltage having a predetermined level based on the DC voltage, and provides the power supply voltage having the predetermined level to a power amplifier.

In 630, the high efficiency variable power transmitting apparatus generates a variable power by modulating a high frequency signal having a constant amplitude on a time by repeatedly outputting and not outputting the high frequency signal according to a low frequency modulation signal having a duty cycle corresponding to an amount of power requested by a target device, and outputs the variable power.

In 640, the high efficiency variable power transmitting apparatus amplifies the variable power to an amount of power requested by the target device using the power amplifier provided with the power supply voltage having the predetermined level.

Figure 7:
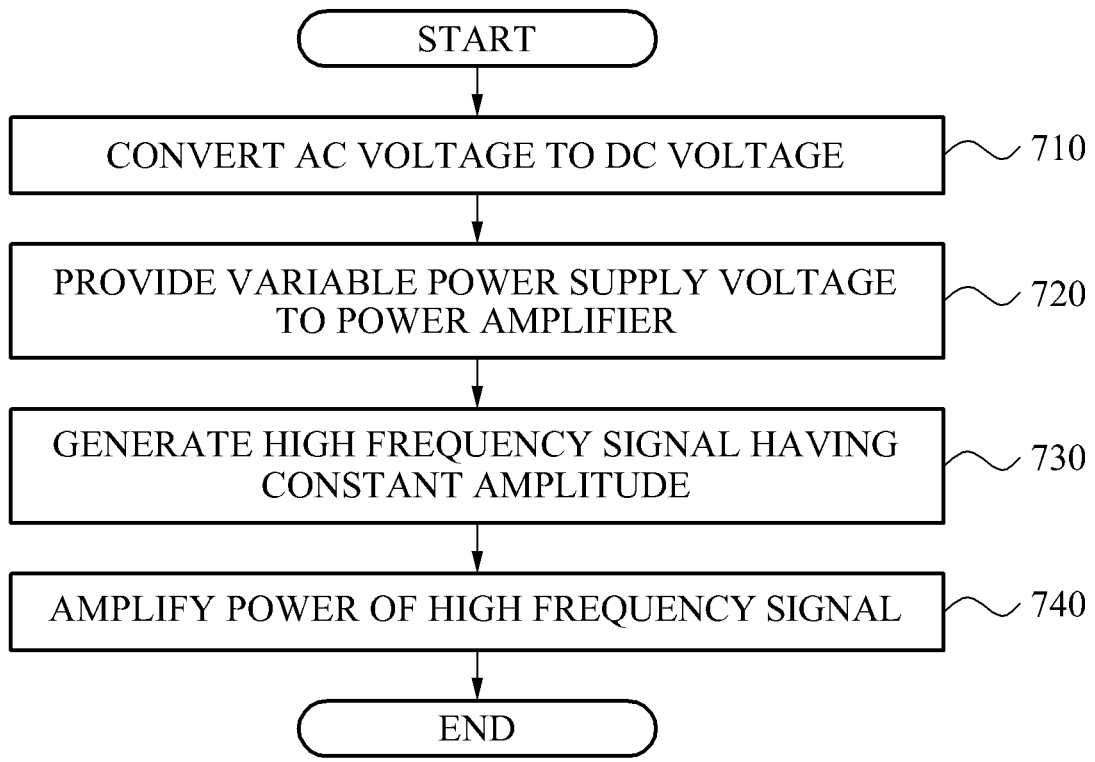
FIG. 7 is a flowchart illustrating another example of a method of transmitting a high efficiency variable power.

FIG. 7 is a flowchart illustrating another example of a method of transmitting a high efficiency variable power. The description of FIG. 4 is also applicable to FIG. 7, but will not be repeated here for conciseness. In 710, an apparatus for transmitting a high efficiency variable power converts an AC voltage received from a power source to a DC voltage.

In 720, the high efficiency variable power transmitting apparatus generates a variable power supply voltage by modulating the DC voltage on a time axis by repeatedly outputting and not outputting the DC voltage according to a low frequency modulation signal having a duty cycle corresponding to an amount of power requested by a target device, and provides the variable power supply voltage to a power amplifier.

In 730, the high efficiency variable power transmitting apparatus generates a high frequency signal having a constant amplitude.

In 740, the high efficiency variable power transmitting apparatus amplifies a power of the high frequency signal to an amount of power requested by the target using the power amplifier provided with the variable power supply voltage.

Figure 8:
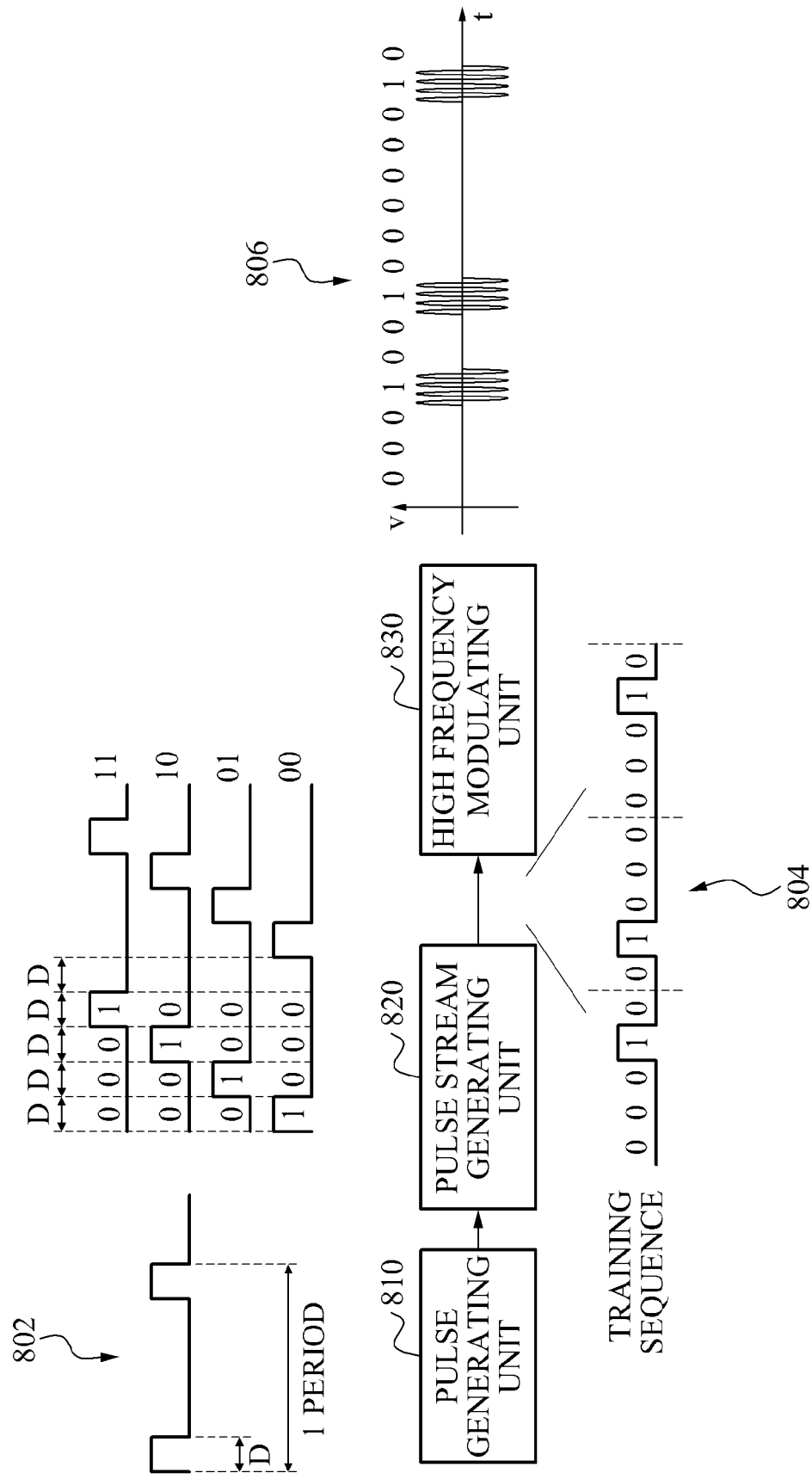
FIG. 8 is a block diagram illustrating an apparatus for transmitting a high efficiency variable power together with data.

FIG. 8 is a block diagram illustrating an apparatus for transmitting a high efficiency variable power together with data. Referring to FIG. 8, the high efficiency variable power transmitting apparatus includes a pulse generating unit 810, a pulse stream generating unit 820, and a high frequency modulating unit 830.

The pulse generating unit 810 generates a pulse signal 802 having a predetermined period and a pulse having a duration corresponding to an amount of power to be transmitted. The duration of the pulse is less than the predetermined period. The amount of power to be transmitted may be an amount of power requested by a target device to which power is to be transmitted. In the example in FIG. 8, the predetermined period has a duration of 5D, where D is a predetermined unit duration. The duration of the pulse of the pulse signal 802 may be 0D, 1D, 2D, 3D, or 4D depending on the amount of power to be transmitted. However, this is just an example, and the predetermined period may have a duration of ND, wherein N is an integer greater than 1, and the pulse of the pulse signal 802 may have a duration of nD, where n is an integer from 0 to N−1. When the duration is 0D, no power is to be transmitted, and the pulse signal 802 does not include a pulse.

The pulse stream generating unit 820 converts the pulse signal 802 generated by the pulse generating unit 810 to a pulse stream 804 having a pulse shape corresponding to the duration of the pulse of the pulse signal 802 and data to be transmitted.

The pulse stream generating unit 820 searches for a pulse shape corresponding to the duration of the pulse of the pulse signal 802 and the data to be transmitted in a table in which pulse shapes are mapped to combinations of durations and data, and converts the pulse signal 802 to the pulse stream 804 having a pulse shape identified in the searching. An example of the table that is searched by the pulse stream generating unit 820 to identify the pulse shape is shown in FIG. 10.

FIG. 10 is a diagram illustrating an example of a table used to identify a pulse shape corresponding to a duration of a pulse signal and data to be transmitted in an apparatus for transmitting a high efficiency variable power. Referring to FIG. 10, the table lists durations of pulses ranging from 1D to 4D, data ranging from 00 to 11 for each duration, and a unique pulse shape for each combination of a duration and data. Each pulse shape has a duration of 5D, and has a value of 0 or 1 in each predetermined unit duration D. The table in FIG. 10 is based on the example in FIG. 8 in which the predetermined period has a duration of 5D, and data having 2 bits. However, the table may be modified to list durations ranging from 1D to (N−1)D, data having any number of bits, and pulse shapes having a duration of ND, where N is an integer greater than 1. The table does not list pulse shapes for a duration of 0D, because when the duration is 0D, no power is to be transmitted, and therefore no data can be transmitted.

FIG. 8 shows examples of pulse shapes that are identified from the table in FIG. 10 for the duration of 1D of the pulse signal 802 and data to be transmitted of 00, 01, 10, and 11.

Referring again to FIG. 8, the pulse stream generating unit 820 inserts a training sequence indicating a beginning of the pulse stream at the beginning of the pulse stream 804 generated by the pulse stream generating unit 820 from the pulse signal 802. The training sequence indicates that the pulse stream that follows the training sequence is a pulse stream including pulse shapes corresponding to durations of the pulses of the pulse signal 802 and data to be transmitted.

The high frequency modulating unit 830 outputs a variable power 806 by modulating a high frequency signal having a constant amplitude on a time axis by repeatedly outputting and not outputting the high frequency signal based on the pulse stream 804.

Figure 9:
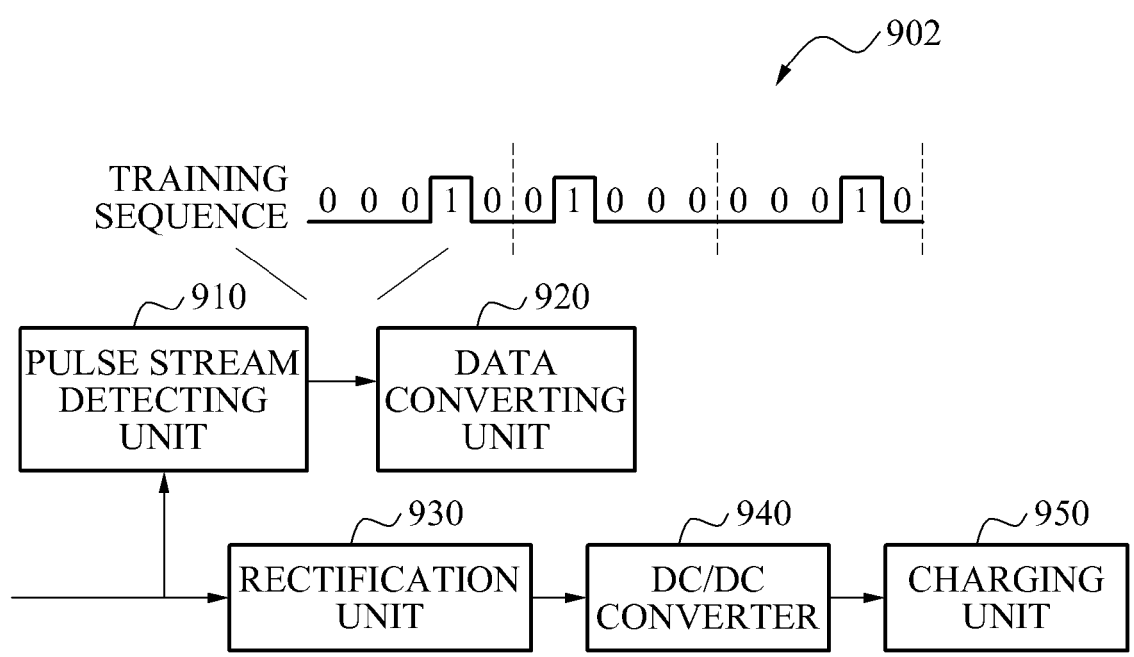
FIG. 9 is a block diagram illustrating an apparatus for receiving a high efficiency variable power together with data.

FIG. 9 is a diagram illustrating an apparatus for receiving a high efficiency variable power together with data. Referring to FIG. 9, the apparatus includes a pulse stream detecting unit 910, a data converting unit 920, a rectification unit 930, a DC/DC converter 940, and a charging unit 950.

The pulse stream detecting unit 910 extracts a pulse stream 902 from a signal received from a source device operating as a transmitter. The pulse stream detecting unit 910 extracts the pulse stream 902 by detecting a beginning of the pulse stream 902 by detecting a training sequence in the signal received from the source device. The training sequence appears immediately before the pulse stream 902, and indicates the beginning of the pulse stream 902 as discussed above in connection with FIG. 8.

The data converting unit 920 segments the pulse stream 902 into segments each having a predetermined period, and outputs data corresponding to pulse shapes of the segments of the segmented pulse stream. The data converting unit 920 identifies the data corresponding to the pulse shapes of the segments of the segmented pulse stream by searching a table in which pulse shapes are mapped to data. FIG. 10 shows an example of the table that is searched by the data converting unit 920 to identify the data corresponding to the pulse shapes of the segments of the segmented pulse stream. In the example in FIG. 9, each of the segments of the segmented pulse stream has a duration of 5D, where D is a predetermined unit duration. This is based on the example in FIG. 8, where the predetermined period has a duration of 5D. However, this is just an example, and the predetermined period and the segments of the segmented pulse stream may have a duration of ND, where N is an integer greater than 1.

The rectification unit 930 generates a DC voltage by rectifying the received signal.

The DC/DC converter 940 adjusts a level of the DC voltage generated by the rectification unit 930 to a predetermined level, and outputs the adjusted DC voltage.

The charging unit 950 uses the adjusted DC voltage output from the DC/DC converter 940 to charge a battery or provide an operating voltage. An amount of power provided to the charging unit 950 is determined by an average duration of the pulses of the received signal.

Figure 11:
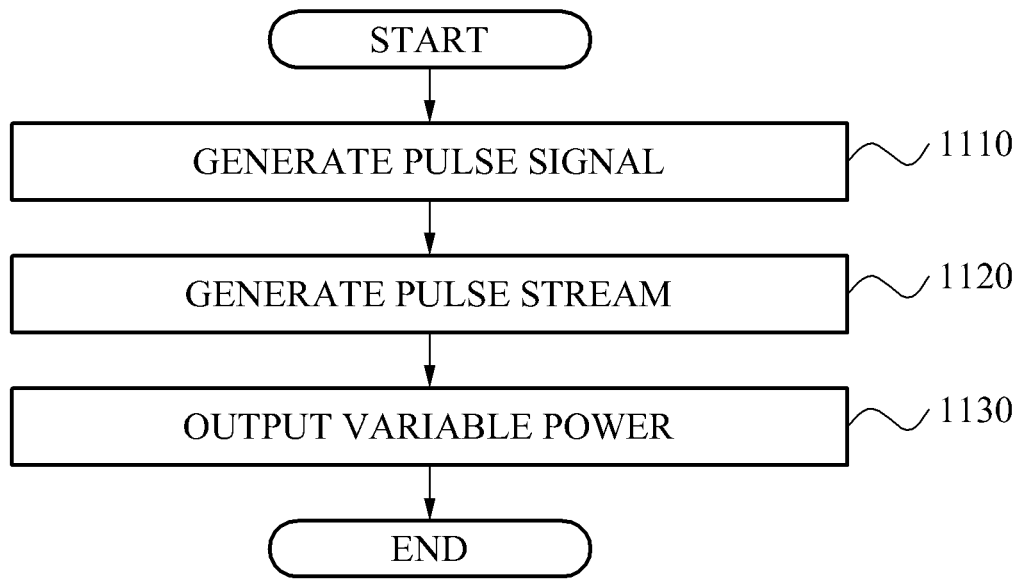
FIG. 11 is a flowchart illustrating a method of transmitting a high efficiency variable power together with data.

FIG. 11 is a flowchart illustrating a method of transmitting a high efficiency variable power together with data. The description of FIG. 8 is also applicable to FIG. 11, but will not be repeated here for conciseness. In 1110, an apparatus for transmitting a high efficiency variable power generates a pulse signal having a predetermined period and including a pulse having a duration corresponding to an amount of power to be transmitted. The duration of the pulse is less than the predetermined period.

In 1120, the high efficiency variable power transmitting apparatus converts the pulse signal to a pulse stream having a pulse shape correspond to the duration of the pulse of the pulse signal and data to be transmitted. The high efficiency variable power transmitting apparatus searches for a pulse shape corresponding to the duration of the pulse of the pulse signal and the data to be transmitted in a table in which pulse shapes are mapped to combinations of durations and data, and converts the pulse signal to the pulse stream having a pulse stream identified in the searching. An example of the table that is searched to identify the pulse shape is shown in FIG. 10.

The high efficiency variable power transmitting apparatus inserts a training sequence indicating a beginning of the pulse stream at the beginning of the pulse stream generated from the pulse signal.

In 1130, the high efficiency variable power transmitting apparatus outputs a variable power by modulating a high frequency signal having a constant amplitude on a time axis by repeatedly outputting and not outputting the high frequency signal based on the pulse stream.

Figure 12:
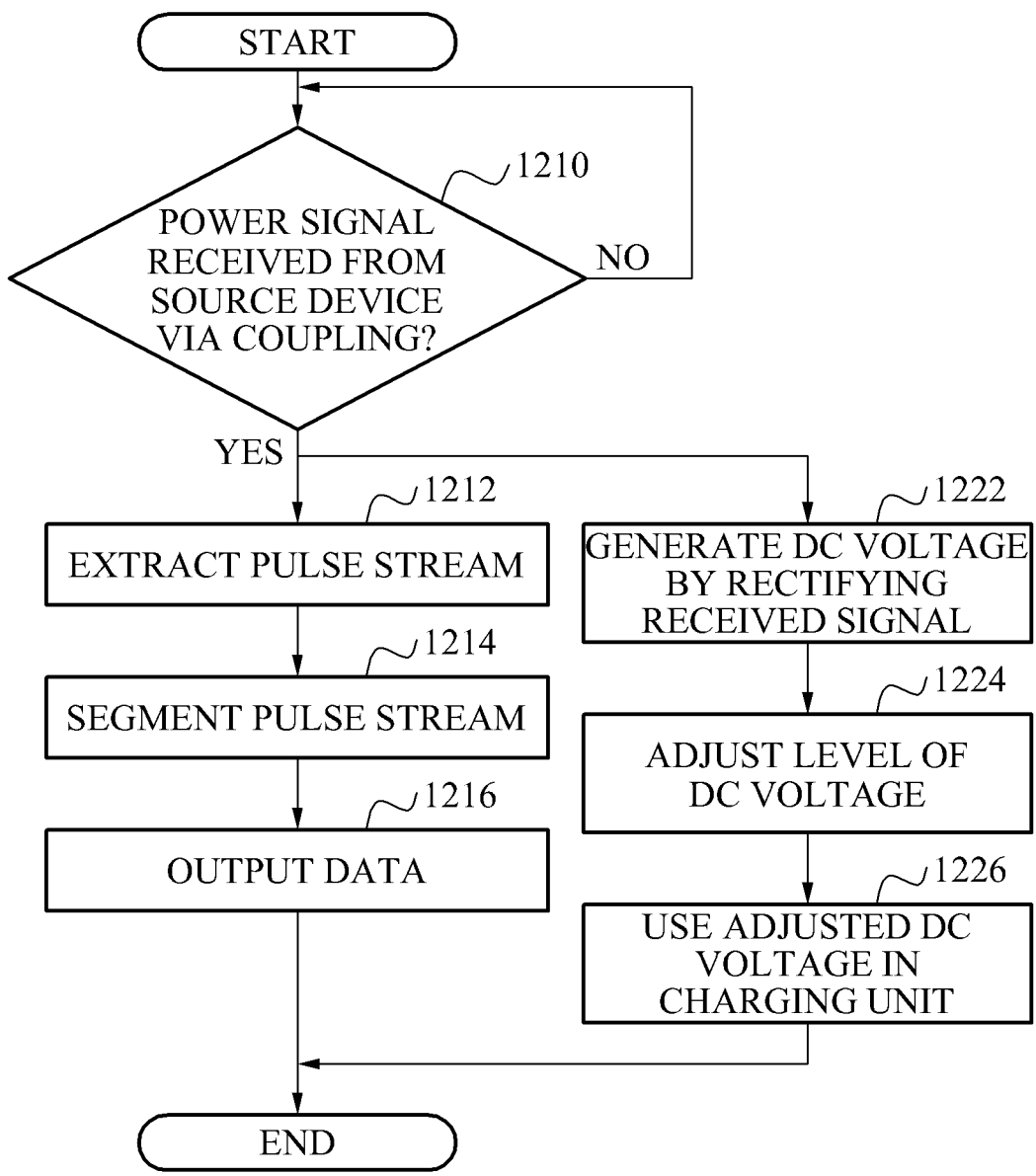
FIG. 12 is a flowchart illustrating a method of receiving a high efficiency variable power together with data.

FIG. 12 is a flowchart illustrating a method of receiving a high efficiency variable power together with data. The description of FIG. 9 is also applicable to FIG. 12, but will not be repeated here for conciseness. In 1210, an apparatus for receiving a high efficiency variable power determines whether a power signal is received from a source device operating as a transmitter via coupling.

When it is determined that a power signal is received in 1210, the high efficiency variable power receiving apparatus extracts a pulse stream from the received signal in 1212. In 1214, the high efficiency variable power receiving apparatus segments the extracted pulse stream into segments each having a predetermined period. In 1216, the high efficiency variable power receiving apparatus outputs data corresponding to pulse shapes of the segments of the segmented pulse stream. The data corresponding to the pulse shapes of the segments of the segmented pulse stream are identified by searching a table in which pulse shapes are mapped to data. FIG. 10 shows an example of a table that is searched to identify the data corresponding to the pulse shapes.

When it is determined that a power signal is received in 1210, the high efficiency variable power receiving apparatus also generates a DC voltage by rectifying the received signal in 1222. In 1224, the high efficiency variable power receiving apparatus adjusts a level of the generated DC voltage to a predetermined level, and outputs the adjusted DC voltage. In 1226, the high efficiency variable power receiving apparatus uses the adjusted DC voltage in a charging unit to charge a battery or provide an operating voltage. An amount of power provided to the charging unit is determined by an average duration of the pulses of the received signal.

The examples described above applicable to any products or systems that transmit a power wirelessly.

FIGS. 13 through FIGS. 18, 19A, and 19B illustrate various examples of a resonator that may be used to transmit and receive a power together with data wirelessly.

Figure 13:
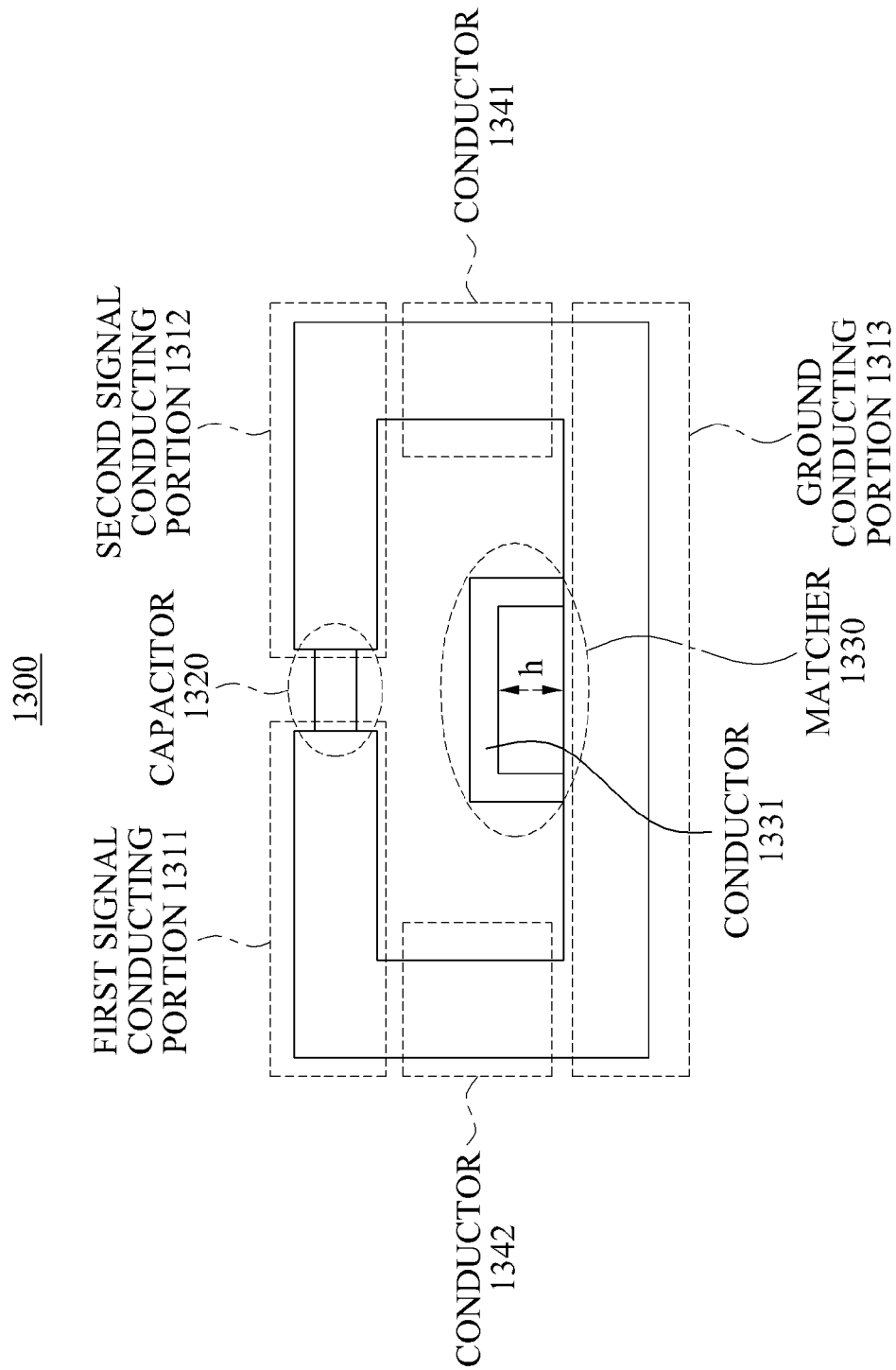
FIGS. 13 through 18, 19A, and 19B are diagrams illustrating various examples of a resonator that may be used to transmit and receive a power together with data wirelessly.

FIG. 13 illustrates an example of a resonator 1300 having a two-dimensional (2D) structure. Referring to FIG. 13, the resonator 1300 having the 2D structure includes a transmission line (not identified by a reference numeral in FIG. 13, but formed by various elements in FIG. 13 as discussed below), a capacitor 1320, and conductors 1341 and 1342. The transmission line includes a first signal conducting portion 1311, a second signal conducting portion 1312, and a ground conducting portion 1313. Although one capacitor 1320 is illustrated in FIG. 13, a plurality of capacitors 1320 may be provided.

The capacitor 1320 is inserted in series between the first signal conducting portion 1311 and the second signal conducting portion 1312, causing an electric field to be confined within the capacitor 1320. The transmission line may include at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission may be electrically grounded. In the example in FIG. 13, a conductor disposed in an upper portion of the transmission line is separated into the first signal conducting portion 1311 and the second signal conducting portion 1312. A conductor disposed in the lower portion of the transmission line is the ground conducting portion 1313.

As shown in FIG. 13, the resonator 1300 has a 2D structure. The transmission line includes the first signal conducting portion 1311 and the second signal conducting portion 1312 in the upper portion of the transmission line, and the ground conducting portion 1313 in the lower portion of the transmission line. The first signal conducting portion 1311 and the second signal conducting portion 1312 face the ground conducting portion 1313. Current flows through the first signal conducting portion 1311 and the second signal conducting portion 1312.

One end of the first signal conducting portion 1311 is connected to one end of the conductor 1342, the other end of the first signal conducting portion 1311 is connected to one end of the capacitor 1320, and the other end of the conductor 1342 is connected to one end of the ground conducting portion 1313. One end of the second signal conducting portion 1312 is connected to one end of the conductor 1341, the other end of the second signal conducting portion 1312 is connected to the other end of the capacitor 1320, and the other end of the conductor 1341 is connected to the other end of the ground conducting portion 1313. Accordingly, the first signal conducting portion 1311, the second signal conducting portion 1312, the ground conducting portion 1313, and the conductors 1341 and 1342 are connected to each other to form an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed, i.e., a structure that forms a closed electrical circuit.

The capacitor 1320 is inserted into an intermediate portion of the transmission line. In the example in FIG. 13, the capacitor 1320 is inserted into a space between the first signal conducting portion 1311 and the second signal conducting portion 1312. The capacitor 1320 may be a lumped element capacitor, a distributed element capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1320 inserted into the transmission line may cause the resonator 1300 to have a characteristic of a metamaterial. A metamaterial is a material having a predetermined electrical property that is not found in nature, and thus may have an artificially designed structure. All materials found in nature have a magnetic permeability and a permittivity. Most materials have a positive magnetic permeability and a positive permittivity.

For most materials, a right-hand rule may be applied to an electric field, a magnetic field, and a Poynting vector of the materials, so the materials may be referred to as right-handed materials (RHMs). However, a metamaterial has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability and the permittivity of the metamaterial.

If the capacitor 1320 is a lumped element capacitor and a capacitance of the capacitor 1320 is appropriately determined, the resonator 1300 may have a characteristic of a metamaterial. If the resonator 1300 is caused to have a negative magnetic permeability by appropriately adjusting the capacitance of the capacitor 1320, the resonator 1300 may be referred to as an MNG resonator 1300. Various criteria may be used to determine the capacitance of the capacitor 1320. For example, the various criteria may include a criterion for enabling the resonator 1300 to have a characteristic of a metamaterial, a criterion for enabling the resonator 1300 to have a negative magnetic permeability at a target frequency, a criterion for enabling the resonator 1300 to have a zeroth order resonance characteristic at the target frequency, and any other suitable criterion. Based on any one or any combination of the aforementioned criteria, the capacitance of the capacitor 1320 may be appropriately determined.

The resonator 1300, hereinafter referred to as the MNG resonator 1300, may have a zeroth order resonance characteristic of having a resonance frequency when a propagation constant is "0". If the MNG resonator 1300 has the zeroth order resonance characteristic, the resonance frequency of the MNG resonator 1300 is independent of a physical size of the MNG resonator 1300. By changing the capacitance of the capacitor 1320, the resonance frequency of the MNG resonator 1300 may be changed without changing the physical size of the MNG resonator 1300.

In a near field, the electric field is concentrated in the capacitor 1320 inserted into the transmission line, causing the magnetic field to become dominant in the near field. The MNG resonator 1300 has a relatively high Q-factor when the capacitor 1320 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

The MNG resonator 1300 also includes a matcher 1330 for performing impedance matching. The matcher 1330 adjusts a strength of a magnetic field of the MNG resonator 1300, and determines an impedance of the MNG resonator 1300. Current flows into and/or out of the MNG resonator 1300 via a connector (not shown), which may be connected to the ground conducting portion 1313 or the matcher 1330. A physical connection may be formed between the connector and the ground conducting portion 1313, or between the connector and the matcher 1330. Alternatively, power may be transferred via coupling without using a physical connection between the connector and the ground conducting portion 1313 or the matcher 1330.

In the example in FIG. 13, the matcher 1330 is positioned within the loop structure of the MNG resonator 1300. The physical shape of the matcher 1330 is changed to adjust the impedance of the MNG resonator 1300. The matcher 1330 includes a conductor 1331 for performing impedance matching spaced apart from the ground conducting portion 1313 by a distance h. Adjusting the distance h changes the impedance of the MNG resonator 1300.

Although not illustrated in FIG. 13, a controller may be provided to control the matcher 1330. For example, the physical shape of the matcher 1330 may be changed based on a control signal generated by the controller. For example, the distance h between the conductor 1331 of the matcher 1330 and the ground conducting portion 1313 may be increased or decreased in response to the control signal. Accordingly, the physical shape of the matcher 1330 may be changed to adjust the impedance of the MNG resonator 1300.

In the example in FIG. 13, the matcher 1330 includes a passive element, i.e., the conductor 1331. However, in another example, the matcher 1330 may include an active element, such as a diode, a transistor, or any other suitable active element known to one of ordinary skill in the art. If an active element is included in the matcher 1330, the active element may be controlled based on the control signal generated by the controller to adjust the impedance of the MNG resonator 1300 based on the control signal. For example, a diode may be included in the matcher 1330 as an active element, and the impedance of the MNG resonator 1300 may be adjusted by turning the diode ON and OFF.

Although not illustrated in FIG. 13, a magnetic core passing through the MNG resonator 1300 may be provided to increase a power transmission distance.

Figure 14:
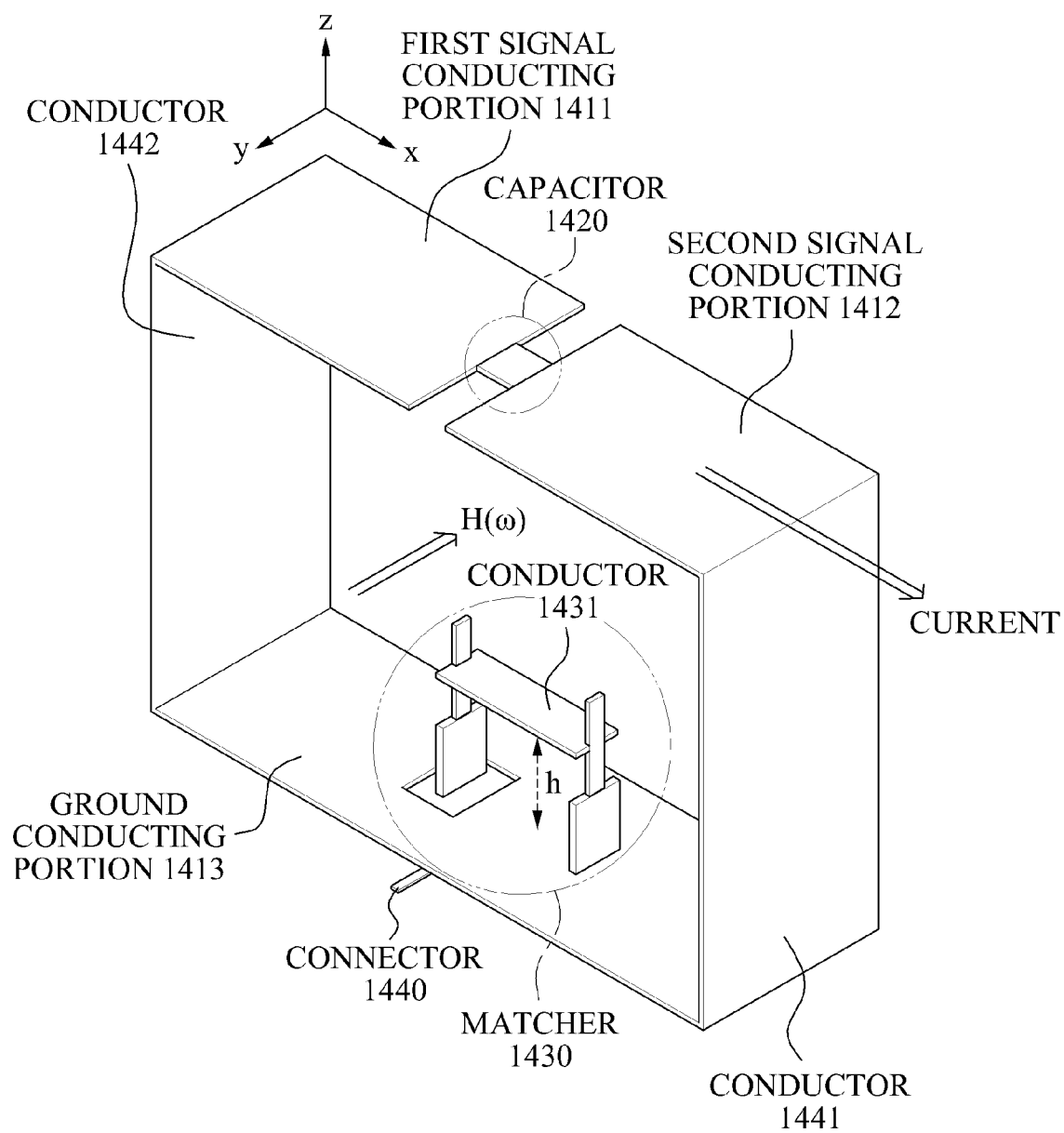

FIG. 14 illustrates an example of a resonator 1400 having a three-dimensional (3D) structure. Referring to FIG. 14, the resonator 1400 having the 3D structure includes a transmission line (not identified by a reference numeral in FIG. 14, but formed by various elements in FIG. 14 as discussed below) and a capacitor 1420. The transmission line includes a first signal conducting portion 1411, a second signal conducting portion 1412, and a ground conducting portion 1413. The capacitor 1420 is connected in series between the first signal conducting portion 1411 and the second signal conducting portion 1412 of the transmission line, causing an electric field to be confined within the capacitor 1420.

As shown in FIG. 14, the resonator 1400 has a 3D structure. The transmission line includes the first signal conducting portion 1411 and the second signal conducting portion 1412 in an upper portion of the resonator 1400, and the ground conducting portion 1413 in a lower portion of the resonator 1400. The first signal conducting portion 1411 and the second signal conducting portion 1412 face the ground conducting portion 1413. In the example in FIG. 14, a current flows in a +x direction through the first signal conducting portion 1411 and the second signal conducting portion 1412, thereby creating a magnetic field $H(\omega)$ in a −y direction. As another example, a current may flow in a −x direction through the first signal conducting portion 1411 and the second signal conducting portion 1412, thereby creating a magnetic field $H(\omega)$ in a +y direction.

One end of the first signal conducting portion 1411 is connected to one end of a conductor 1442, the other end of the first signal conducting portion 1411 is connected to one end of the capacitor 1420, and the other end of the conductor 1442 is connected to one end of the ground conducting portion 1413. One end of the second signal conducting portion 1412 is connected to one end of a conductor 1441, the other end of the second signal conducting portion 1412 is connected to the other end of the capacitor 1420, and the other end of the conductor 1441 is connected to the other end of the ground conducting portion 1413. Accordingly, the first signal conducting portion 1411, the second signal conducting portion 1412, the ground conducting portion 1413, and the conductors 1441 and 1442 are connected to each to form an electrically closed loop structure. Thus, the resonator 1400 of FIG. 4 has an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed, i.e., a structure that forms a closed electrical circuit.

As shown in FIG. 14, the capacitor 1420 is inserted between the first signal conducting portion 1411 and the second signal conducting portion 1412. The capacitor 1420 may be a lumped element capacitor, a distributed element capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1420 inserted into the transmission line may cause the resonator 1400 to have a characteristic of a metamaterial. If the capacitor 1420 is a lumped element capacitor and a capacitance of the capacitor 1420 is appropriately determined, the resonator 1400 may have a characteristic of a metamaterial. If the capacitance of the capacitor 420 is adjusted to cause the resonator 1400 to have a negative magnetic permeability in a predetermined frequency band, the resonator 1400 may also be referred to as an MNG resonator 1400. Various criteria may be used to determine the capacitance of the capacitor 1420. For example, the various criteria may include a criterion for enabling the resonator 1400 to have a characteristic of a metamaterial, a criterion for enabling the resonator 1400 to have a negative magnetic permeability at a target frequency, a criterion for enabling the resonator 1400 to have a zeroth order resonance characteristic at the target frequency, and any other suitable criterion. The capacitance of the capacitor 1420 may be appropriately determined based on any one or any combination of the aforementioned criteria.

The resonator 1400, hereinafter referred to as the MNG resonator 1400, may have a zeroth order resonance characteristic of having a resonance frequency when a propagation constant is "0." If the MNG resonator 1400 has the zeroth order resonance characteristic, the resonance frequency of the MNG resonator 1400 is independent of a physical size of the MNG resonator 1400. By changing the capacitance of the capacitor 1420, the resonance frequency of the MNG resonator 1400 may be changed without changing the physical size of the MNG resonator 1400.

In the MNG resonator 1400 of FIG. 14, in a near field, the electric field is concentrated in the capacitor 1420 inserted into the transmission line, causing the magnetic field to become dominant in the near field due to the electric field being concentrated in the capacitor 1420. The MNG resonator 1400 having the zeroth order resonance characteristic has a characteristic similar to a magnetic dipole, so the magnetic field is dominant in the near field. A relatively small electric field is produced by the insertion of the capacitor 1420, and that small electric field is concentrated in the capacitor 1420, so the magnetic field becomes even more dominant in the near field. The MNG resonator 1400 has a relatively high Q-factor when the capacitor 1420 is a lumped element capacitor, which increases a power transmission efficiency.

Also, the MNG resonator 1400 includes a matcher 1430 for performing impedance matching. The matcher 1430 adjusts a strength of a magnetic field of the MNG resonator 1400, and determines an impedance of the MNG resonator 1400. Current flows into and/or out of the MNG resonator 1400 via a connector 1440 connected to the ground conducting portion 1413 or the matcher 1430.

For example, as shown in FIG. 14, the matcher 1430 is positioned within the loop structure of the MNG resonator 1400. The physical shape of the matcher 1430 is changed to adjust the impedance of the MNG resonator 1400. The matcher 1430 includes a conductor 1431 for performing impedance matching spaced apart from the ground conducting portion 1413 by a distance h. Adjusting the distance h changes the impedance of the MNG resonator 1400.

Although not illustrated in FIG. 14, a controller may be provided to control the matcher 1430. For example, the physical shape of the matcher 1430 may be changes based on a control signal generated by the controller. For example, the distance h between the conductor 1431 of the matcher 1430 and the ground conducting portion 1413 may be increased or decreased in response to the control signal. Accordingly, the physical shape of the matcher 1430 may be changed to adjust the impedance of the MNG resonator 1400. The distance h between the conductor 1431 of the matcher 1430 and the ground conducting portion 1413 may be adjusted using a variety of methods. As one example, the matcher 1430 may include a plurality of conductors located at different distances h from the ground conducting portion 1413, and the distance h may be adjusted by adaptively activating one of the conductors located at a desired distance h from the ground conducting portion 1413. As another example, the distance h may be adjusted by moving the physical location of the conductor 1431 up and down. The distance h may be controlled based on the control signal of the controller. The controller may generate the control signal using various factors.

In the example in FIG. 14, the matcher 1430 includes a passive element, i.e., the conductor 1431. However, in another example, the matcher 1430 may include an active element, such as a diode, a transistor, or any other suitable active element known to one of ordinary skill in the art. If an active element is included in the matcher 1430, the active element may be controlled based on the control signal generated by the controller to adjust the impedance of the MNG resonator 1400 based on the control signal. For example, a diode may be included in the matcher 1430 as an active element, and the impedance of the MNG resonator 1400 may be adjusted by turning the diode ON and OFF.

Although not illustrated in FIG. 14, a magnetic core passing through the MNG resonator 1400 may be provided to increase a power transmission distance.

Figure 15:
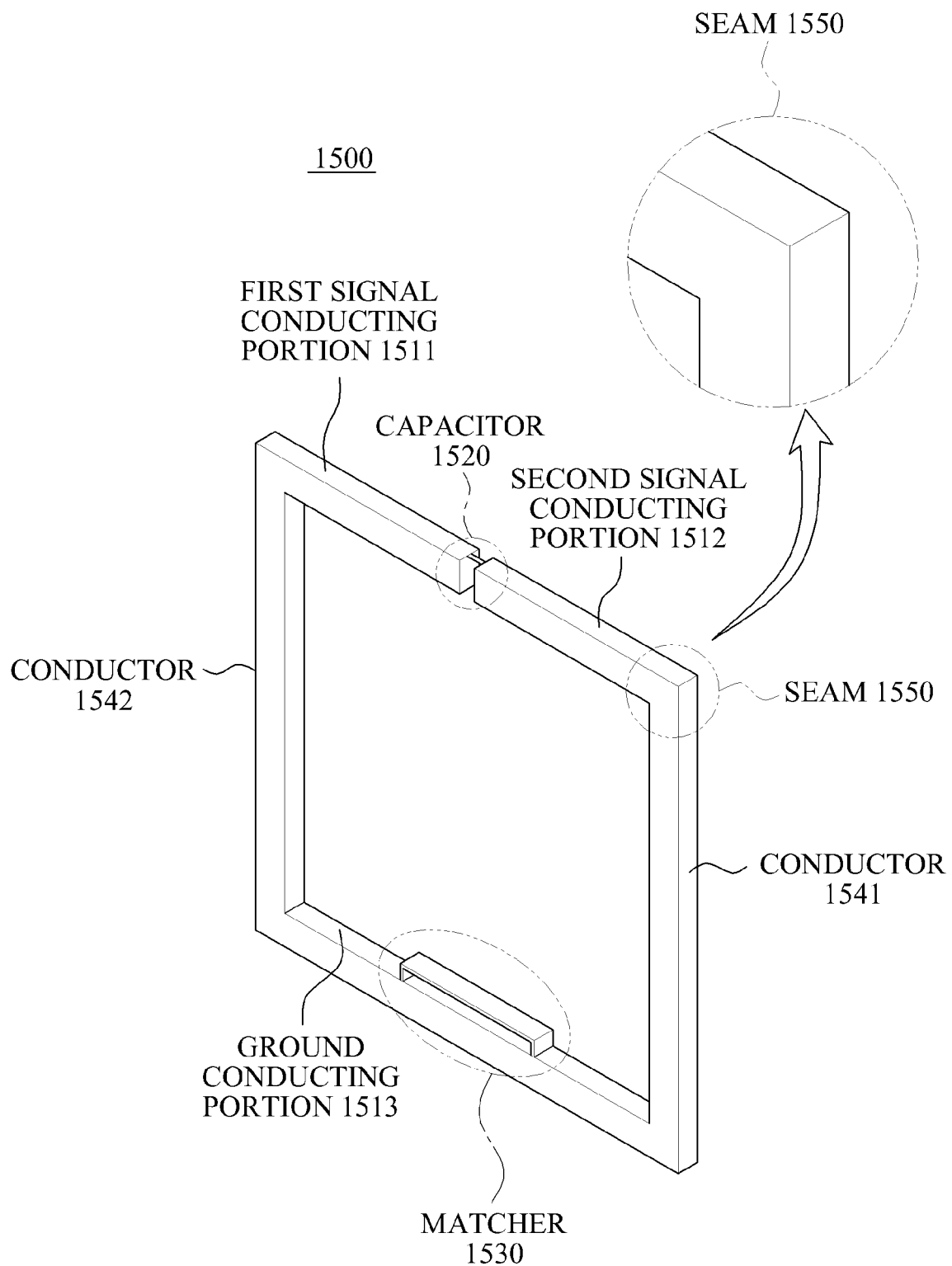

FIG. 15 illustrates an example of a bulk-type resonator 1500 for wireless power transmission. A bulk-type resonator is a resonator in which at least two current-carrying elements are seamlessly connected to each other by being integrally formed as a single unit. Referring to FIG. 15, a first signal conducting portion 1511, a conductor 1542, a ground conducting portion 1513, a conductor 1541, and a second signal conducting portion 1512 are integrally formed as a single unit instead of being separately manufactured and then connected to each other.

If, for example, the second signal conducting portion 1512 and the conductor 1541 were separately manufactured and then are connected to each other, a loss of conduction might occur at a seam 1550. To avoid such a loss of conduction in the bulk-type resonator 1500, the first signal conducting portion 1511, the conductor 1542, the ground conducting portion 1513, the conductor 1541, and the second signal conducting portion 1512 are seamlessly connected to each other by integrally forming these elements as a single unit. Accordingly, a conduction loss caused by seams that would otherwise be required to connect these elements to each other, such as the seam 1550 discussed above, is eliminated. Although in this example, the first signal conducting portion 1511, the conductor 1542, the ground conducting portion 1513, the conductor 1541, and the second signal conducting portion 1512 are integrally formed as a single unit, only some of these elements may be integrally formed as a single unit.

Figure 16:
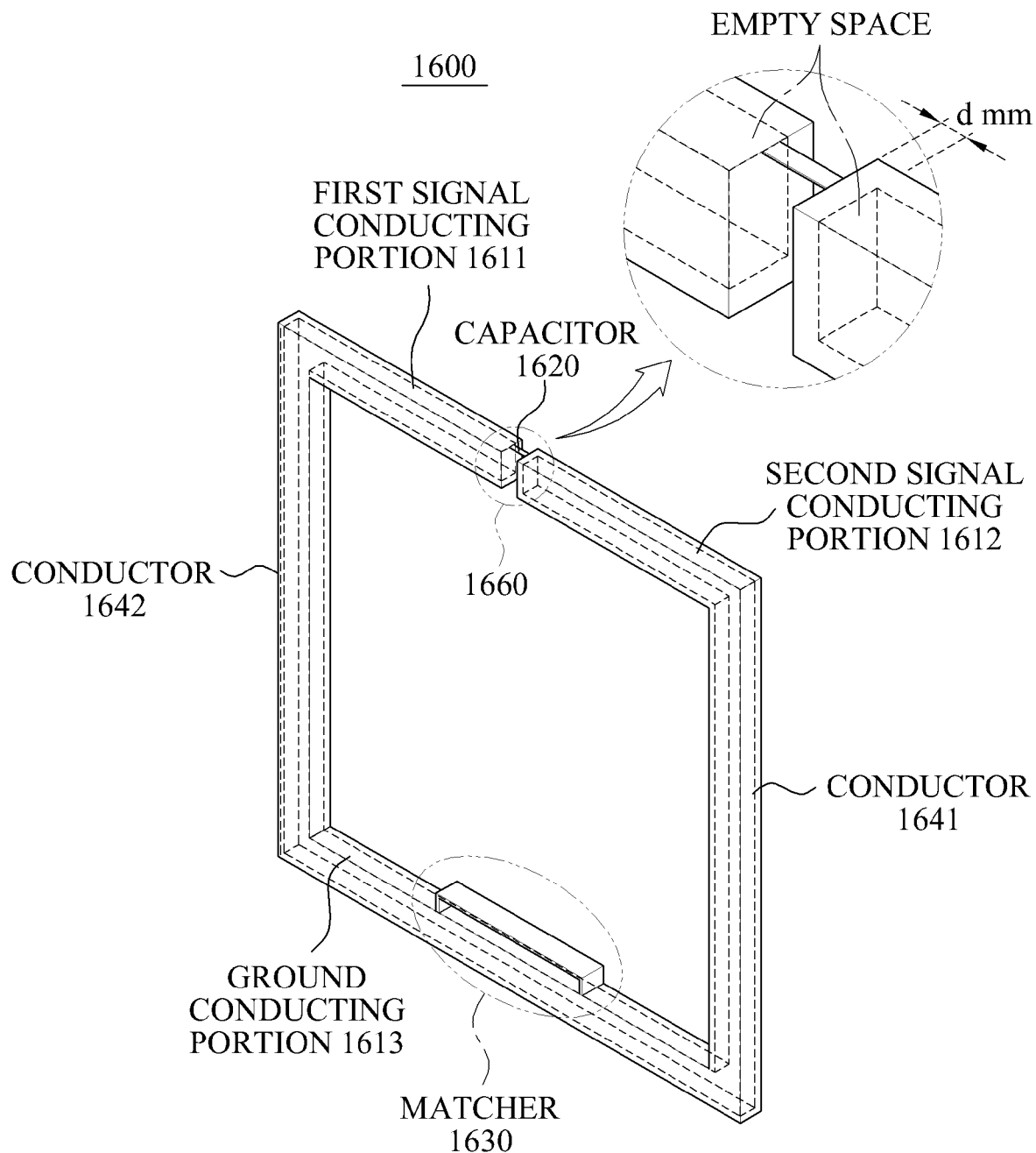

FIG. 16 illustrates an example of a hollow-type resonator 1600 for wireless power transmission. Referring to FIG. 16, a first signal conducting portion 1611, a second signal conducting portion 1612, a ground conducting portion 1613, and conductors 1641 and 1642 each are hollow, i.e., they each have an empty space inside. A capacitor 1620 is connected in series between the first signal conducting portion 1611 and the second signal conducting portion 1612, and a matcher 1630 for impedance matching is provided on the ground conducting portion 1613.

At a given resonance frequency, an alternating current (AC) may be modeled as flowing in only a portion of the first signal conducting portion 1611, the second signal conducting portion 1612, the ground conducting portion 1613, and the conductors 1641 and 1642 between the outer surface of these elements and a level called the skin depth. If a depth of each of the first signal conducting portion 1611, the second signal conducting portion 1612, the ground conducting portion 1613, and the conductors 1641 and 1642 is significantly deeper than a corresponding skin depth at the given resonance frequency, the portions of these elements deeper than the skin depth will be ineffective since substantially no current will flow in these portions. The ineffective portions increase a weight and manufacturing costs of the resonator 1600.

Accordingly, at the given resonance frequency, the depth of each of the first signal conducting portion 1611, the second signal conducting portion 1612, the ground conducting portion 1613, and the conductors 1641 and 1642 is determined based on the corresponding skin depth of each of the first signal conducting portion 1611, the second signal conducting portion 1612, the ground conducting portion 1613, and the conductors 1641 and 1642 so that the ineffective portions deeper than the corresponding skin depth are eliminated, causing the resonator 1600 to become lighter in weight, and causing the manufacturing costs of the resonator 1600 to decrease.

For example, as shown in FIG. 16, a depth of the second signal conducting portion 1612 may be d mm, and d may be determined according to the following Equation 1:

$$d = \frac{1}{\sqrt{\pi f \mu \sigma}} \quad (1)$$

In Equation 1, f denotes a resonance frequency, μ denotes a magnetic permeability of a material of which the first signal conducting portion 1611, the second signal conducting portion 1612, the ground conducting portion 1613, and the conductors 1641 and 1642 are made, and σ denotes an electrical conductivity of the material of which the first signal conducting portion 1611, the second signal conducting portion 1612, the ground conducting portion 1613, and the conductors 1641 and 1642 are made.

If the first signal conducting portion 1611, the second signal conducting portion 1612, the ground conducting portion 1613, and the conductors 1641 and 1642 are made of copper, which has a magnetic permeability μ of $1.257 \times 10^{-6}$ henries per meter ($H \cdot m^{-1}$) and an electrical conductivity σ of $5.8 \times 10^7$ siemens per meter ($S \cdot m^{-1}$), the skin depth d calculated from Equation 1 is about 0.6 mm at a resonance frequency f of 10 kHz, or about 0.006 mm at a resonance frequency f of 100 MHz.

Figure 17:
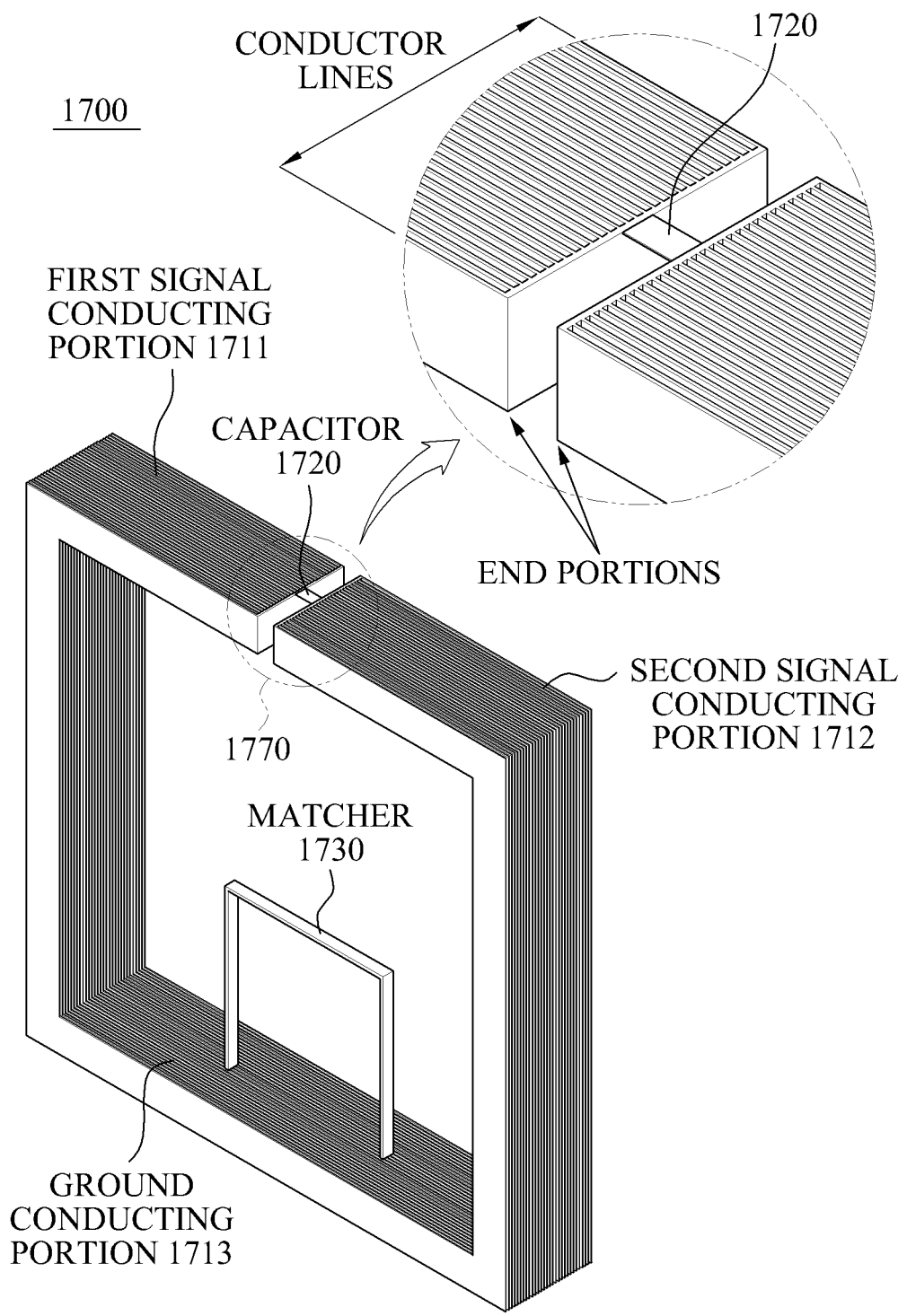

FIG. 17 illustrates an example of a resonator 1700 for wireless power transmission configured as a parallel-sheet type resonator. Referring to FIG. 17, a first signal conducting portion 1711, a second signal conducting portion 1712, a ground conducting portion 1713, and conductors 1741 and 1742 included in the resonator 1700 are each configured as a plurality of parallel sheets. A capacitor 1720 is connected in series between the first signal conducting portion 1711 and the second signal conducting portion 1712, and a matcher 1730 for impedance matching is provided on the ground conducting portion 1713.

Each of the first signal conducting portion 1711, the second signal conducting portion 1712, the ground conducting portion 1713, and the conductors 1741 and 1742 are typically made of a material that is not a perfect conductor, and therefore have a resistance. Due to the resistance, an ohmic loss occurs in the resonator 1700, which decreases a O-factor and a coupling effect.

By configuring each of the first signal conducting portion 1711, the second signal conducting portion 1712, the ground conducting portion 1713, and the conductors 1741 and 1742 as a plurality of parallel sheets, the ohmic loss may be decreased, thereby increasing the Q-factor and the coupling effect.

Referring to a portion 1770 indicated by a circle, each of the first signal conducting portion 1711, the second signal conducting portion 1712, the ground conducting portion 1713, and the conductors 1741 and 1742 includes a plurality of conductor lines configured as a plurality of sheets disposed parallel to each other and shorted together at an end portion of each of the first signal conducting portion 1711 and the second signal conducting portion 1712. This causes resistances of the conductor lines to be connected in parallel, causing a total resistance of the conductor lines to be less than a resistance of each of the conductor lines, thereby decreasing the ohmic loss, thereby increasing the Q-factor and the coupling.

Figure 18:
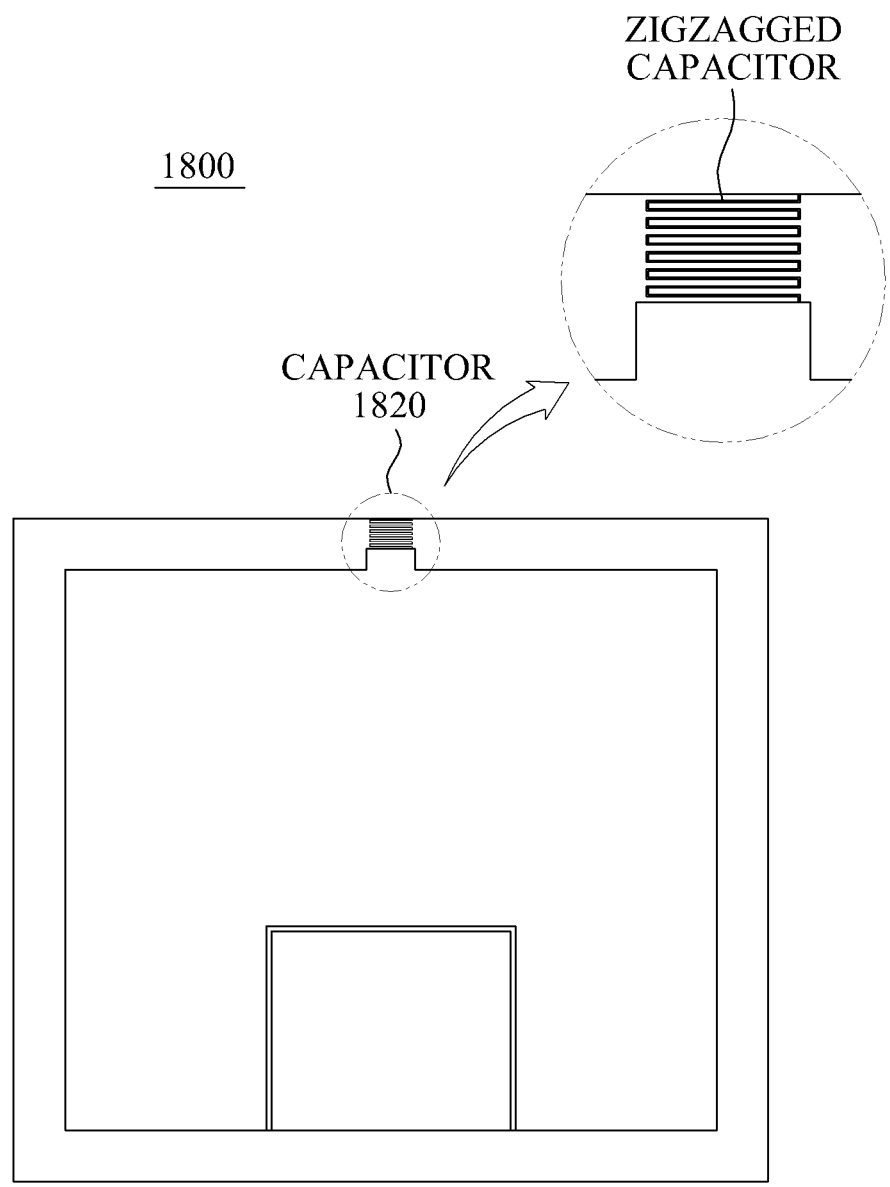

FIG. 18 illustrates an example of a resonator 1800 for wireless power transmission that includes a distributed element capacitor. Referring to FIG. 18, a distributed element capacitor 1820 is included in the resonator 1800 for wireless power transmission. A lumped element capacitor has a relatively high equivalent series resistance (ESR). The ESR causes an ohmic loss that decreases a Q factor and a coupling effect. A variety of techniques may be used to decrease the ESR of a capacitor. In this example, by using the distributed element capacitor 1820 instead of a lumped element capacitor, the ESR is decreased, thereby decreasing the ohmic loss caused by the ESR and increasing a Q-factor and a coupling effect.

In the example in FIG. 18, the distributed element capacitor 1820 has a zigzagged structure configured as a zigzagged conductive line and a dielectric material having a high permittivity disposed between parallel portions of the zigzagged conductor line.

Employing the distributed element capacitor 1820 having the zigzagged structure decreases an ohmic loss caused by the ESR. The distributed element capacitor 820 having the zigzagged structure may be modeled as a plurality of lumped element capacitors connected in parallel. Since a total resistance of a plurality of resistances connected in parallel is less than each of the resistances, the total ESR of a plurality of lumped element capacitors connected in parallel is less than an ESR of each of the lumped element capacitors. For example, by employing ten 1 pF capacitors each connected in parallel instead of employing a single 10 pF capacitor, it is possible to decrease the ohmic loss occurring caused by the ESR because the total ESR of the ten 1 pF capacitors connected in parallel is one-tenth the ESR of the single 10 pF capacitor.

Figure 19A:
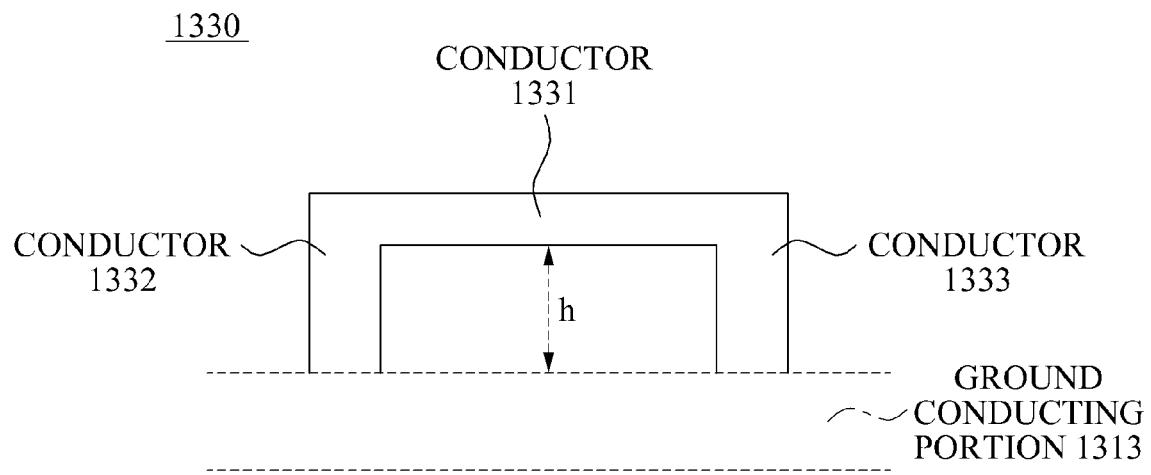
Figure 19B:
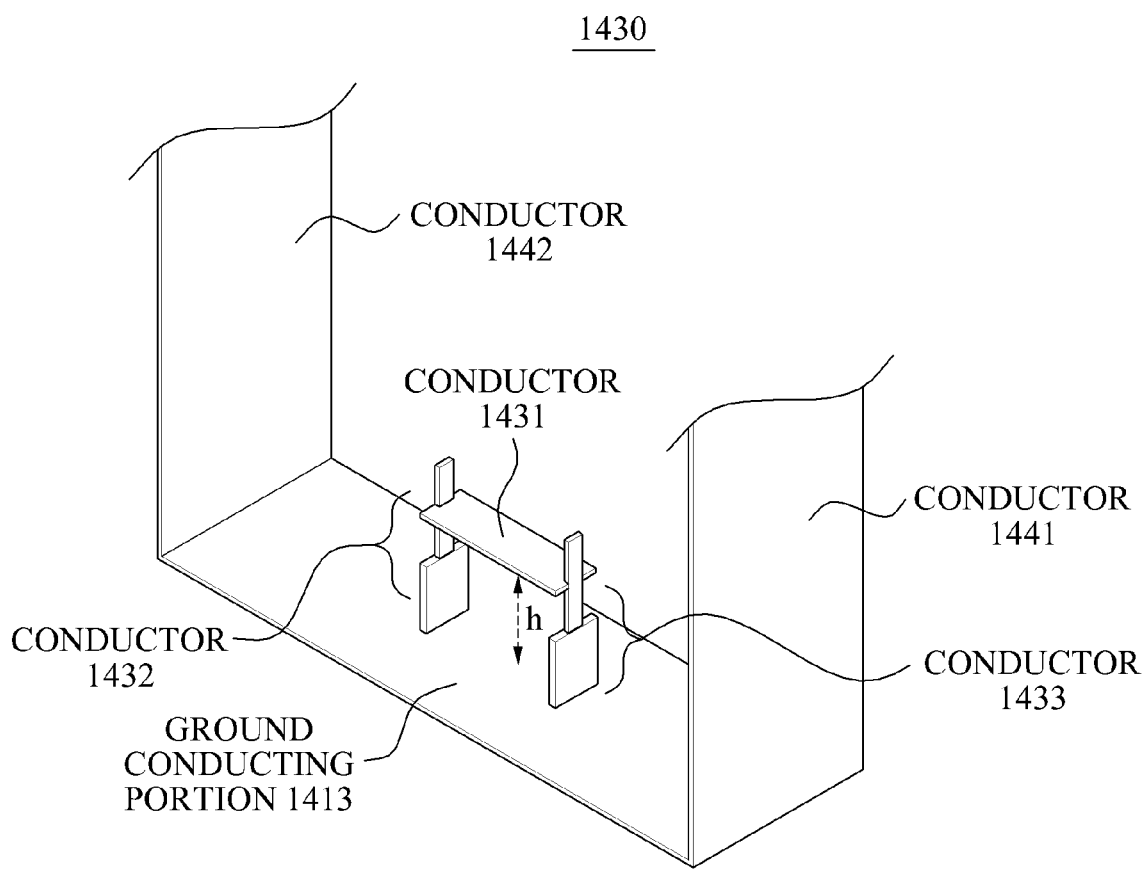

FIG. 19A illustrates an example of the matcher 1330 of the MNG resonator 1300 having the 2D structure of FIG. 13, and FIG. 19B illustrates an example of the matcher 1430 of the MNG resonator 1400 having the 3D structure of FIG. 14. Specifically, FIG. 19A illustrates a portion of the MNG resonator 1300 of FIG. 13 including the matcher 1330, and FIG. 19B illustrates a portion of the MNG resonator 1400 of FIG. 14 including the matcher 1430.

Referring to FIG. 19A, the matcher 1330 includes the conductor 1331, a conductor 1332, and a conductor 1333. The conductors 1332 and 1333 are connected to the ground conducting portion 1313 and the conductor 1331. The impedance of the MNG resonator 1300 depends on a distance h between the conductor 1331 and the ground conducting portion 1313. The distance h between the conductor 1331 and the ground conducting portion 1313 may be controlled by a controller (not illustrated in FIG. 19A, but discussed above in connection with FIG. 13). The distance h between the conductor 1331 and the ground conducting portion 1313 may be adjusted using a variety of methods. For example, the variety of methods may include a method of providing a plurality of conductors 1331 at different distances h from the ground conducting portion 1313 and adjusting the distance h by adaptively activating one of the plurality of conductors 1331, and a method of adjusting the physical location of the conductor 1331 up and down.

Referring to FIG. 19B, the matcher 1430 includes the conductor 1431, a conductor 1432, and a conductor 1433. The conductors 1432 and 1433 are connected to the ground conducting portion 1413 and the conductor 1431. The impedance of the MNG resonator 1400 depends on a distance h between the conductor 1431 and the ground conducting portion 1413. The distance h between the conductor 1431 and the ground conducting portion 1413 may be controlled by a controller (not illustrated in FIG. 19B, but discussed above in connection with FIG. 14). Similar to the matcher 1330 of the MNG resonator 1300 in FIG. 19A, the distance h between the conductor 1431 and the ground conducting portion 1413 may be adjusted using a variety of methods. For example, the variety of method may include a method of providing a plurality of conductors 1431 at different distances h from the ground conducting portion 1413 and adjusting the distance h by adaptively activating one of the plurality of conductors 1431, and a method of adjusting the physical location of the conductor 1431 up and down.

Although not illustrated in FIGS. 19A and 19B, the matchers 1330 and 1430 may include an active element. A method of adjusting an impedance of resonators 1300 and 1400 using the active element may be similar the method described above in connection with FIGS. 13 and 14. For example, the impedance of the resonators 1300 and 1400 may be adjusted by changing a path of a current flowing through the matchers 1330 and 1430 using the active element.

Figure 20:
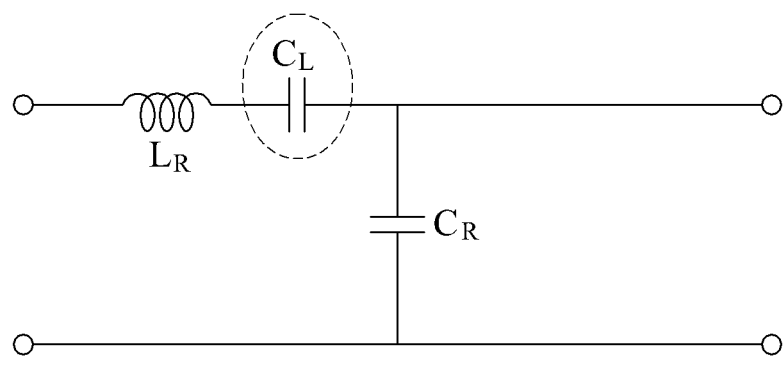
FIG. 20 is a diagram illustrating an example of an equivalent circuit of the MNG resonator for wireless power transmission of FIG. 13.

FIG. 20 is a diagram illustrating an example of an equivalent circuit of the MNG resonator 1300 for wireless power transmission of FIG. 13. The MNG resonator 1300 may be modeled as the equivalent circuit of FIG. 20. In the equivalent circuit of FIG. 20, $L_R$ denotes an inductance of the MNG resonator 1300, $C_R$ denotes a capacitance of the MNG resonator 1300, and $C_L$ denotes a lumped element capacitor inserted in approximately the middle of the transmission line of the MNG resonator 1300 of FIG. 13.

In this example, the MNG resonator 1300 has a zeroth order resonance characteristic in which the MNG resonator 1300 has a resonance frequency $\omega_{MZR}$ when a propagation constant is "0". The resonance frequency $\omega_{MZR}$ may be expressed by the following Equation 2.

$$\omega_{MZR} = \frac{1}{\sqrt{L_R C_L}} \quad (2)$$

In Equation 2, MZR denotes a mu zero resonator. The capacitance $C_R$ of the MNG resonator 1300 is negligible compared to the capacitance $C_L$ of the lumped element capacitor, so it is omitted from Equation 2.

Referring to Equation 2, the resonance frequency $\omega_{MZR}$ of the MNG resonator 1300 depends on $L_R C_L$. Since the MNG resonator 1300 has a zeroth order resonance characteristic in this example, a physical size of the MNG resonator 1300 and the resonance frequency $\omega_{MZR}$ of the MNG resonator 1300 are independent of each other, and therefore the physical size of the MNG resonator 1300 may be reduced without changing the resonance frequency $\omega_{MZR}$.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. A Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for transmitting a high efficiency variable power, the apparatus comprising:
    a pulse generating unit configured to generate a pulse signal comprising a pulse having a duration corresponding to an amount of power to be transmitted;
    a pulse stream generating unit configured to convert the pulse signal to a pulse stream having a pulse shape corresponding to the duration of the pulse and data to be transmitted by adjusting a pulse position of the pulse signal; and
    a high frequency modulating unit configured to output a variable power by modulating a high frequency signal having a constant amplitude on a time axis by repeatedly outputting and not outputting the high frequency signal based on the pulse stream.

2. The apparatus of claim 1, wherein the pulse stream generating unit is further configured to:
    search for a pulse shape corresponding to the duration of the pulse and the data to be transmitted in a table in which pulse shapes are mapped to durations and data; and
    convert the pulse signal to the pulse stream using the pulse shape found in the search.

3. The apparatus of claim 1, wherein the pulse stream generating unit is further configured to insert a training sequence indicating a beginning of the pulse stream at the beginning of the pulse stream generated from the pulse signal.

4. The apparatus of claim 1, wherein the pulse signal has a predetermined period; and
    the duration of the pulse is less than the predetermined period.

5. The apparatus of claim 1, wherein the amount of power to be transmitted is an amount of power requested by a target device to which power is to be transmitted by the apparatus.

6. A method of transmitting a high efficiency variable power, the method comprising:
    generating a pulse signal comprising a pulse having a duration corresponding to an amount of power to be transmitted;
    converting the pulse signal to a pulse stream having a pulse corresponding to the duration of the pulse and data to be transmitted by adjusting a pulse position of the pulse signal; and
    outputting a variable power by modulating a high frequency signal having a constant amplitude on a time axis by repeatedly outputting and not outputting the high frequency signal based on the pulse stream.

7. The method of claim 6, wherein the converting comprises:
    searching for a pulse shape corresponding to the duration of the pulse and the data to be transmitted in a table in which pulse shapes are mapped to durations and data; and
    converting the pulse signal to the pulse stream using the pulse shape found in the search.

8. The method of claim 6, wherein the converting comprises inserting a training sequence indicating a beginning of the pulse stream at the beginning of the pulse stream generated from the pulse signal.

9. The method of claim 6, wherein the pulse signal has a predetermined period; and
    the duration of the pulse is less than the predetermined period.

10. The method of claim 6, wherein the amount of power to be transmitted is an amount of power requested by a target device to which power is to be transmitted.

* * * * *